US012614242B2

(12) United States Patent
Rhodes et al.

(10) Patent No.:  US 12,614,242 B2
(45) Date of Patent:      Apr. 28, 2026

(54) METHODS AND APPARATUS TO IMPLEMENT DUAL-ATTENTION VISION TRANSFORMERS FOR INTERACTIVE IMAGE SEGMENTATION

(71) Applicant: Intel Corporation, Santa Clara, CA (US)

(72) Inventors: Anthony Rhodes, Portland, OR (US); Ke Ding, San Jose, CA (US); Neil Yeung, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 17/832,366

(22) Filed: Jun. 3, 2022

(65) Prior Publication Data

US 2022/0301097 A1      Sep. 22, 2022

(51) Int. Cl.
| | |
|---|---|
| *G06T 1/20* | (2006.01) |
| *G06F 9/50* | (2006.01) |
| *G06T 1/60* | (2006.01) |
| *G06T 7/10* | (2017.01) |

(52) U.S. Cl.
CPC .............. *G06T 1/20* (2013.01); *G06F 9/5061* (2013.01); *G06T 1/60* (2013.01); *G06T 7/10* (2017.01)

(58) Field of Classification Search
CPC . G06F 9/5061; G06T 1/60; G06T 1/20; G06T 7/10; G06T 2207/10016; G06T 2207/20081; G06T 2207/10024; G06T 2207/20084; G06T 2207/20101; G06T 2207/20132; G06T 7/11; G06N 3/091; G06N 3/0455
See application file for complete search history.

(56) References Cited

U.S. PATENT DOCUMENTS

| | | | | |
|---|---|---|---|---|
| 9,361,662 | B2 * | 6/2016 | Lelescu | G06T 5/80 |
| 9,858,673 | B2 * | 1/2018 | Ciurea | G06T 7/85 |
| 11,538,166 | B2 * | 12/2022 | Arani | G06V 10/82 |

(Continued)

OTHER PUBLICATIONS

Chen et al., "A Simple Single-Scale Vision Transformer for Object Localization and Instance Segmentation," dated Dec. 17, 2021, retrieved from [https://arxiv.org/abs/2112.09747], 12 pages.

(Continued)

*Primary Examiner* — Phi Hoang
(74) *Attorney, Agent, or Firm* — Hanley, Flight & Zimmerman, LLC

(57)      ABSTRACT

Methods, apparatus, systems, and articles of manufacture are disclosed to implement dual attention vision transformers for interactive image segmentation. In some examples, the apparatus includes memory, instructions, and processor circuitry to execute and/or instantiate the instructions to partition information in an input tensor into a plurality of tensor crops, the input tensor representing image data of an image. The processor circuitry is further to execute and/or instantiate the instructions to create a dual-attention tensor representation of the input tensor, including an inter-attention tensor representation describing a first correlation between the plurality of tensor crops and an intra-attention tensor representation describing a second correlation between a plurality of layers in a tensor crop of the plurality of tensor crops.

23 Claims, 12 Drawing Sheets

(56)         References Cited

U.S. PATENT DOCUMENTS

| 2021/0089807 | A1* | 3/2021 | Liu | G06V 20/70 |
| 2021/0374911 | A1* | 12/2021 | Kudo | G06N 3/045 |
| 2022/0108478 | A1* | 4/2022 | Houlsby | G06T 7/97 |
| 2022/0270346 | A1* | 8/2022 | Babiloni | G06V 40/168 |
| 2022/0383630 | A1* | 12/2022 | Beyer | G06V 10/7747 |
| 2023/0049729 | A1* | 2/2023 | Berlin | G06T 11/00 |
| 2023/0154024 | A1* | 5/2023 | Guizilini | G06T 7/593 |
| | | | | 382/103 |

OTHER PUBLICATIONS

Devlin et al., "BERT: Pre-training of Deep Bidirectional Transformers for Language Understanding," Proceedings of NAACL-HLT 2019, pp. 4171-4186, dated Jun. 2-Jun. 7, 2019, 16 pages.

Jang et al., "Interactive Image Segmentation via Backpropagating Refinement Scheme," Proceedings of The IEEE Conference on Computer Vision and Pattern Recognition, 2019, retrieved from [https://vcg.seas.harvard.edu/ publications/interactive-image-segmentation-via-backpropagating-refinement-scheme] on Mar. 16, 2022, 10 pages.

Li et al., "Interactive Image Segmentation with Latent Diversity," 2018 IEEE/CVF Conference on Computer Vision and Pattern Recognition, Jun. 18-23, 2018, retrieved from [https://openaccess.thecvf.com/content_cvpr_2018/papers/Li_Interactive_Image_Segmentation_CVPR_2018_paper.pdf], 9 pages.

Sofiiuk et al., "f-BRS: Rethinking Backpropagating Refinement for Interactive Segmentation," dated Aug. 25, 2020, retrieved from [https://arxiv.org/abs/2001.10331], 16 pages.

Vaswani et al., "Attention Is All You Need," dated Dec. 6, 2017, retrieved from [https://arxiv.org/abs/1706.03762] 15 pages.

Dosovitskiy et al., "An Image is worth 16×16 Words: Transformers for Image Recognition at Scale," Jun. 3, 2021, conference paper at ICLR 2021, retrieved from [https://arxiv.org/abs/2010.11929], 22 pages.

Brown et al., "Language Models are Few-Shot Learners," Jul. 22, 2020, retrieved from [https://arxiv.org/abs/2005.14165], 75 pages.

* cited by examiner

VECTOR OUTPUT
408

ENCODER BLOCK
CIRCUITRY (A)
118A

406B

MULTI-LAYER PERCEPTRON (MLP) CIRCUITRY
402

NORMALIZATION CIRCUITRY
404B

406A

MULTI-HEADED SELF-ATTENTION (MSA)
CIRCUITRY
400

NORMALIZATION CIRCUITRY
404A

EMBEDDED TENSOR
REPRESENTATION
206

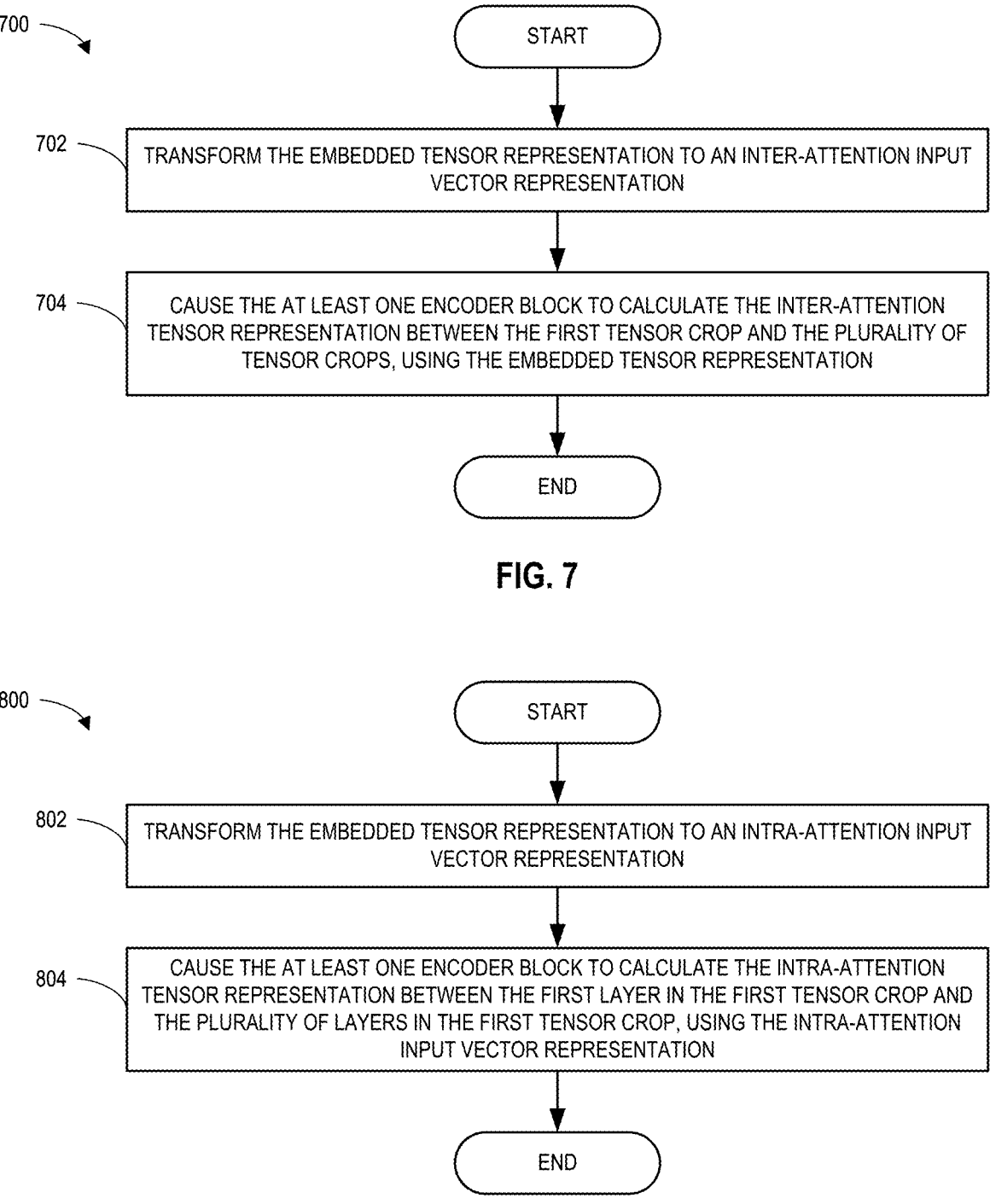

700

702 — TRANSFORM THE EMBEDDED TENSOR REPRESENTATION TO AN INTER-ATTENTION INPUT VECTOR REPRESENTATION

704 — CAUSE THE AT LEAST ONE ENCODER BLOCK TO CALCULATE THE INTER-ATTENTION TENSOR REPRESENTATION BETWEEN THE FIRST TENSOR CROP AND THE PLURALITY OF TENSOR CROPS, USING THE EMBEDDED TENSOR REPRESENTATION

802 — TRANSFORM THE EMBEDDED TENSOR REPRESENTATION TO AN INTRA-ATTENTION INPUT VECTOR REPRESENTATION

804 — CAUSE THE AT LEAST ONE ENCODER BLOCK TO CALCULATE THE INTRA-ATTENTION TENSOR REPRESENTATION BETWEEN THE FIRST LAYER IN THE FIRST TENSOR CROP AND THE PLURALITY OF LAYERS IN THE FIRST TENSOR CROP, USING THE INTRA-ATTENTION INPUT VECTOR REPRESENTATION

FIG. 8

METHODS AND APPARATUS TO IMPLEMENT DUAL-ATTENTION VISION TRANSFORMERS FOR INTERACTIVE IMAGE SEGMENTATION

FIELD OF THE DISCLOSURE

This disclosure relates generally to computer vision and, more particularly, to implementing dual-attention vision transformers for interactive image segmentation.

BACKGROUND

Work on object segmentation has been ongoing since the inception of computer vision. Object segmentation tasks initially relied on the use of hand-crafted features and distance metrics. Then, convolutional neural networks (CNNs) were introduced and became the standard model for representing prior knowledge related to the appearances of objects in an image stream. In recent years, transformers were introduced as an attention-based model for natural language processing applications and purely attention-based vision transformers for object segmentation.

BRIEF DESCRIPTION OF THE DRAWINGS

FIG. 7 is a flowchart representative of example machine readable instructions and/or example operations that may be executed and/or instantiated by processor circuitry to implement the dual-attention vision transformer of FIG. 1 to calculate an inter-attention tensor representation.

FIG. 8 is a flowchart representative of example machine readable instructions and/or example operations that may be executed and/or instantiated by processor circuitry to implement the dual-attention vision transformer of FIG. 1 to calculate an intra-attention tensor representation.

Figure 1:
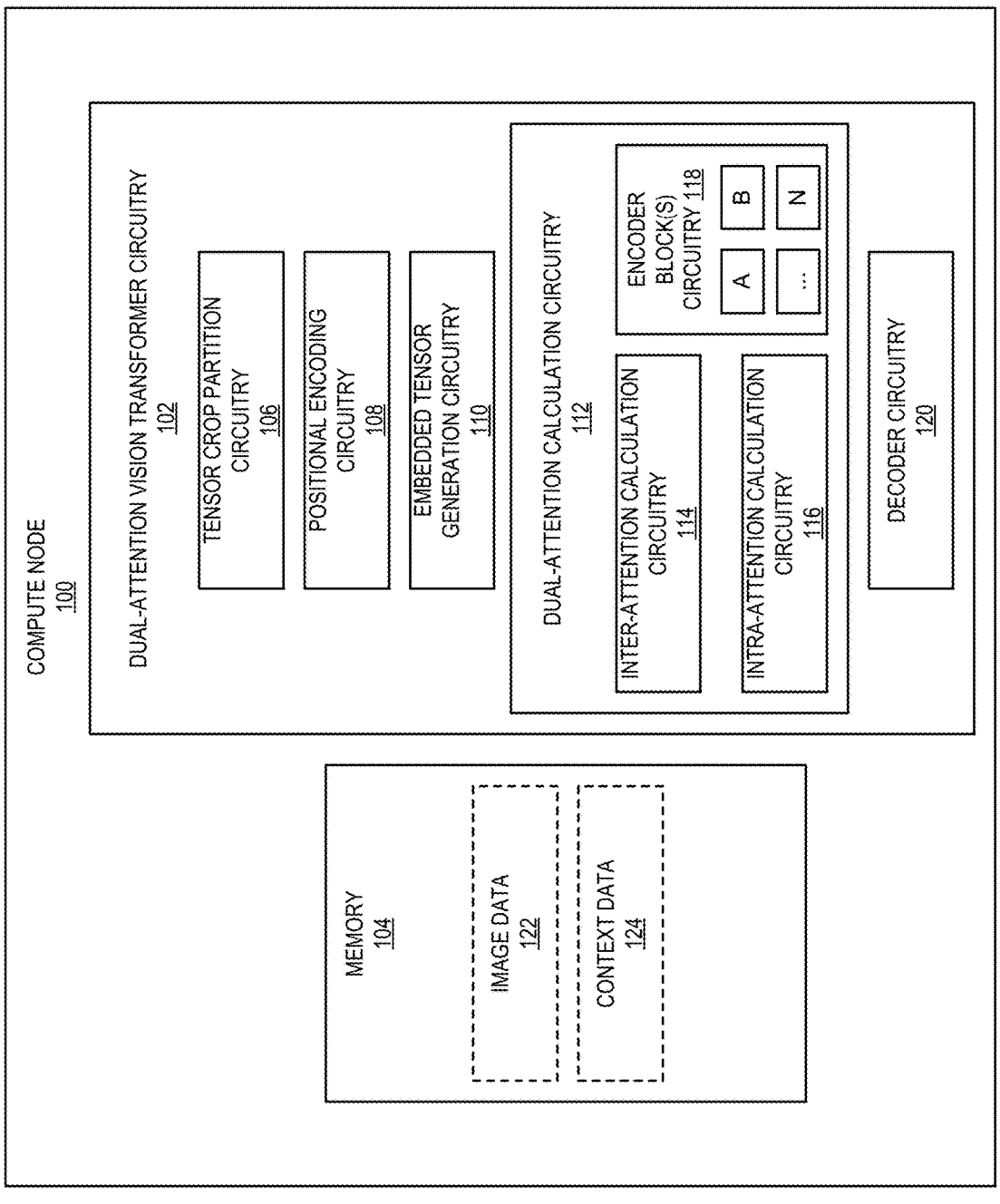
FIG. 1 is an illustration of an example compute node implementing a dual attention vision transformer for interactive image segmentation.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

The figures are not to scale. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Interactive image segmentation is a problem of applying user input (e.g., positive and negative clicks, approximate segmentations) to render a pixel-level segmentation of an object of interest in an image. While prior transformers are used for natural language processing, computer vision and other imaging technologies, they have some shortcomings. Most notably, existing transformers lack strong inductive biases and generally require several orders of magnitude more data to adequately train when compared to comparable-sized models containing strong inductive biases (e.g., CNNs). Training vision transformers to be effective has previously required millions, if not billions, of images, which has made transformers largely incompatible when training on small datasets.

Examples disclosed herein provide a dual-attention vision transformer to perform interactive image segmentation. Examples disclosed herein are described herein in connection with "image" data segmentation as the task of choice. However, examples disclosed herein may be used to segment other type of data, such as video data, audio data, multiple languages for natural language processing, cryptographic content, or any one or more other type of data. Within vision transformers, there are many tasks that may use the transformer model. In the examples below, an image will be described in the context of obtaining feedback about the image from one or more users.

The data of an image file may be in any format that can be read and is defined herein as "image data." In some examples, the image data may include one or more color channels of the image, which provide color information on a per-pixel basis. Each color channel may be referred to as a layer of image data (e.g., an image data layer), where the image is generally made up of a number of color channels. For example, an image may be stored in an image database and loaded into the memory of a compute node (e.g., a laptop computer, a desktop computer, a phone, a tablet, a workstation, etc.) to be displayed on a screen for a user.

The feedback on image data obtained from a user could take many forms, but in examples disclosed herein the data utilized is feedback from one or more users who have been tasked to click on the image displayed to them with a pointing device (e.g., a mouse, a pen, his/her finger) to provide input (e.g., user-related annotation information) to an application that trains a neural network. In some examples, a user is told to click one or more times on parts of an object in the image. These clicks are defined as "positive clicks." The user may also be told to click one or more times on locations in the image where the object is not located. These clicks are defined as "negative clicks." In examples disclosed herein, positive clicks and negative clicks data are referred to as "context features." In examples disclosed herein, context features can be described or represented in one or more context feature layer(s) of an image. During a training phase such context feature layer(s) of the image can be used as training data to train one or more vision transformers. The dual-attention vision transformer is a neural network model that is trained in part based on the context features represented in the context feature layers. Examples disclosed herein may be used with any other suitable type of context feature(s) in addition to or instead of positive clicks and negative clicks, such as a time feature, a specific user identification (ID) feature (e.g., identifying the person making the clicks), as well as context features that are related to spatial relatedness (discussed below) of clicks to an object. The image data and the associated context features data are then input to the dual-attention vision transformer neural network model for training purposes. In some examples, the context features data are considered "associated" with the image data because click positions are related to pixel positions in the image. In examples disclosed herein, the dual-attention vision transformer neural network model may increase efficiency of human-in-the-loop data driven workflows, such as human users providing annotated feedback/labeling for images to train neural network models, by lessening the training requirements needed to accurately utilize annotated feedback for image segmentation.

Attention refers to a mechanism in a transformer that determines the "relatedness" (e.g., correlation, similarity)

between data. In some examples, the "relatedness" between data can be referred to as how correlated a piece of data/information is to another piece of data/information. In some examples, the correlation between data can refer to data or events involving the same type of data occurring concurrently or in a causal manner (e.g., pixels of a first color being adjacent to other pixels of the first color). In some examples, the correlation between data can refer to how likely an event or a piece of data/information of any data type is to occur assuming another event or piece of data/information of any data type (e.g., a similar or disparate data type) has occurred. For example, in examples disclosed herein pixel type of data (e.g., in image data) is spatially coordinated with click type of data (e.g., in user click data). A correlation between these two different data types may be how likely a pixel type of data in an image is to occur within some proximity of a click type of data (e.g., for a user click on the image). In another example, a correlation of the same or similar data types may involve concurrent relatedness or causal relatedness between two different data items (e.g., image data) that are both of the same pixel data type. Specifically, some examples may involve determining how likely it is that that a correlation or comparison between pixel data among a group of spatially proximate pixels will reveal pixels having similar values (e.g., similar values of each color channel), where the correlation or comparison is among image data regions/patches/crops.

Example dual-attention calculation circuitry disclosed herein calculates/determines how different parts of a piece of data relate, such as words in a sentence or pixels in an image. Vision transformers can take an image that is split into crops (e.g., portions, segments, patches, etc.) and use attention to determine how closely related each crop is to another crop. For example, in a picture of 1000 pixels by 1000 pixels, each crop may be a 10-by-10 patch of pixels. Thus, there may be a grid or matrix of 100 crops by 100 crops. In other examples, the size of the image and/or the size of the crops may be any other suitable sizes.

Examples disclosed herein use two forms of attention referred to herein as "inter-attention" and "intra-attention." As used herein, inter-attention refers to the attention (e.g., the relatedness, correlation, similarity) of an image crop to multiple image crops (including to itself, the same image crop). For example, an image of a red stop-sign that includes the sky as the background around the sign is an example to understand inter-attention as the relatedness/correlation between crops in the image and/or between one or more crops of the image and one or more crops of other images. The crops of the image that largely include portions of the stop sign would be more highly related (e.g., more correlated) to other stop sign crops and the crops of the image that largely include portions of the sky would be more highly related/correlated to other sky crops. And conversely, a stop sign crop would exhibit less relatedness/correlation to a sky crop, and vice versa. The dual-attention calculation circuitry processes the data layers, including the image data layers and the context features data layers. Based on the processing of the data layers, the dual-attention calculation circuitry determines the relatedness among crops.

In examples disclosed herein, "intra-attention" refers to attention across the layers of data within a single image crop. As discussed above, image data may include multiple layers, such as multiple image color channels. Additionally, an image crop may include multiple layers, each corresponding to a different type of data. For example, to represent three different color channels (e.g., for RGB (red (R), green (G), blue (B)) encoding or for luminance and chrominance (YUV) encoding), an image crop may include multiple color layers, each for a corresponding color channel. Other example types of data in addition to or instead of color channels that can be represented in layers include context features data. Such context features may be stored in one or more context features data layers that overlay (or underlay) the image data layers. Multiple layers (e.g., all or less than all layers) combined include one or more image data layers and one or more context features data layers. In some examples, intra-attention of an image is determined by calculating the relatedness (e.g., correlation, similarity) of the data in each layer of the image to the data in other layers of the image (e.g., the data in all of the other layers of an image or in a subset of layers).

A "tensor crop" is defined herein as a crop portion of the image that includes one or more image data layers and one or more context features data layers. Thus, in the 1000-by-1000 pixel image described above with the grid of 10-by-10 pixel crops, a first tensor crop may be the top left 10-by-10 crop of some or all of the data layers associated with that spatial representation of the data (e.g., the 10-by-10 portions of each image data layer and the 10-by-10 portions of each context feature data layer). In some examples, calculating the relatedness (e.g., correlation) of each of the data layers in the tensor crop to each of the other data layers may provide more detailed information for the tensor crops.

In examples disclosed herein, dual-attention refers to a data encoding based on both inter-attention and intra-attention. For example, a dual-attention encoding can be generated by a transformer attention encoding process by using both inter-attention encoding and intra-attention encoding in parallel. A process for determining the dual-attention aspect of the vision transformer model includes the inter-attention calculation that determines attention between tensor crops of an image (and their associated context features) and the intra-attention calculation that determines attention within each tensor crop of an image (e.g., layer-by-layer within each tensor crop) independently from the inter-attention determination described above. Dual-attention introduces finer-grain attention features in the training of the dual-attention vision transformer neural network model and enables the model to learn complex correlations between user-related annotation features/information (and potentially other context features) and raw image data.

FIG. 1 is an illustration of an example compute node 100 that includes an example dual-attention vision transformer circuitry 102 to perform interactive image segmentation. The example compute node 100 may be a laptop computer, a desktop computer, a workstation, a phone, a tablet, or any other type of computing device. In some examples, the compute node 100 may be a virtual machine running on a single physical computer or that is made up of portions of several compute nodes across a distributed network or cloud infrastructure. Examples of the detailed hardware structure of the compute node 100 are described below in connection with FIGS. 9-12. In some examples, the dual-attention vision transformer circuitry 102 includes actual physical hardware circuitry. In some examples, the dual-attention vision transformer circuitry 102 is instantiated by software and/or firmware running on other more general-purpose hardware circuitry.

The example dual-attention vision transformer circuitry 102 includes example tensor crop partition circuitry 106, example positional encoding circuitry 108, example embedded tensor generation circuitry 110, example dual-attention calculation circuitry 112, and example decoder circuitry 120. The example dual-attention calculation circuitry 112 includes example inter-attention calculation circuitry 114, example intra-attention calculation circuitry 116, and example encoder block(s) circuitry 118. The example encoder block(s) circuitry 118 can be implemented as one or more blocks, shown by way of example as blocks A and B through N.

Additionally, the example compute node 100 includes an example memory 104. In different examples, the memory 104 can be physical memory that could include volatile memory (e.g., dynamic random access memory (DRAM), static random access memory (SRAM, etc.), non-volatile memory, buffer memory within processor circuitry, a cache memory, or any one or more other types of memory. In some examples, the memory 104 stores one or more images in the form of image data 122 and associated context features in the form of context data 124.

Figure 2A:
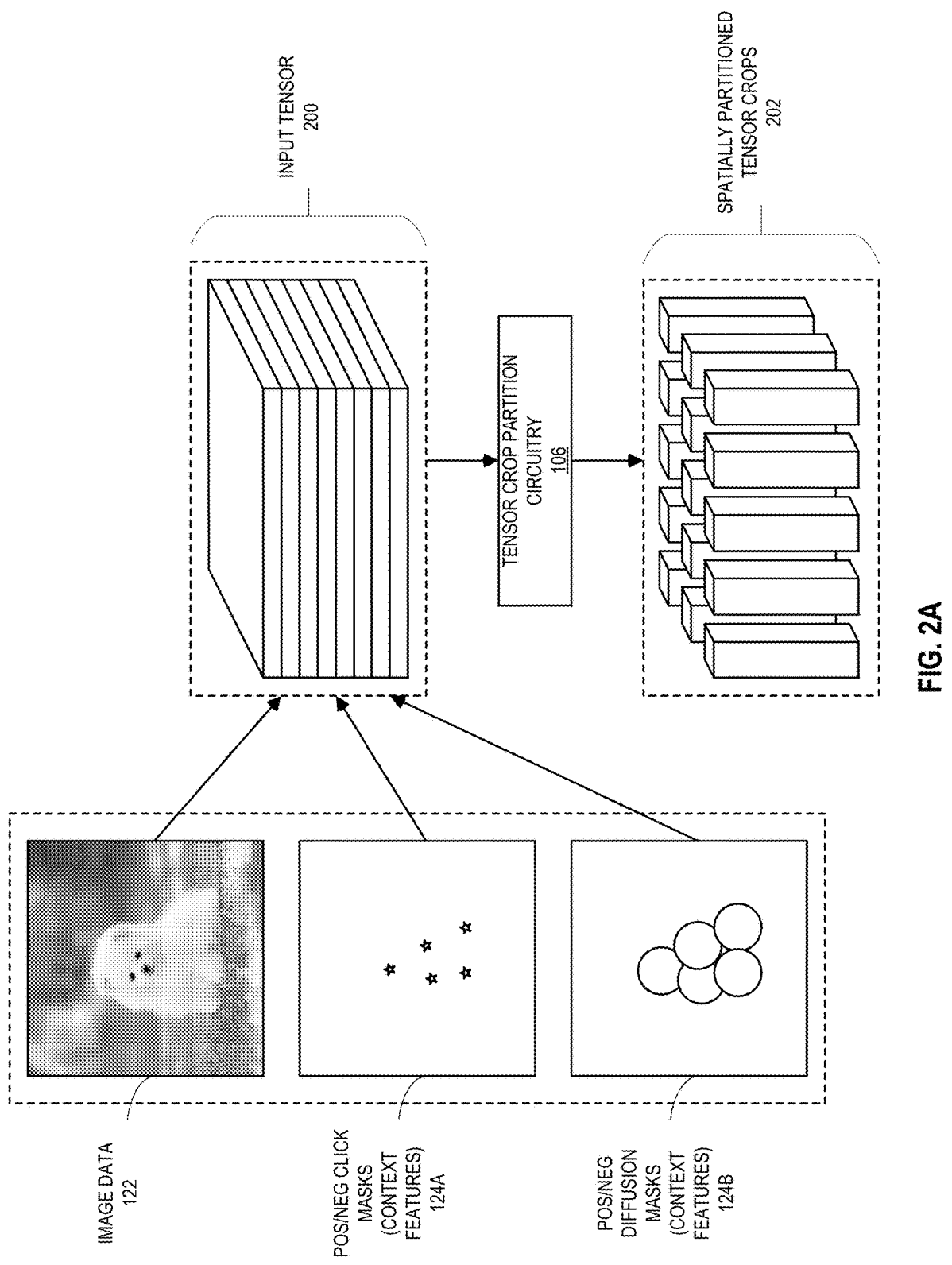
FIGS. 2A and 2B are illustrations of an example flow of information through the example compute node of FIG. 1 implementing the dual-attention vision transformer for interactive image segmentation.
Figure 2B:
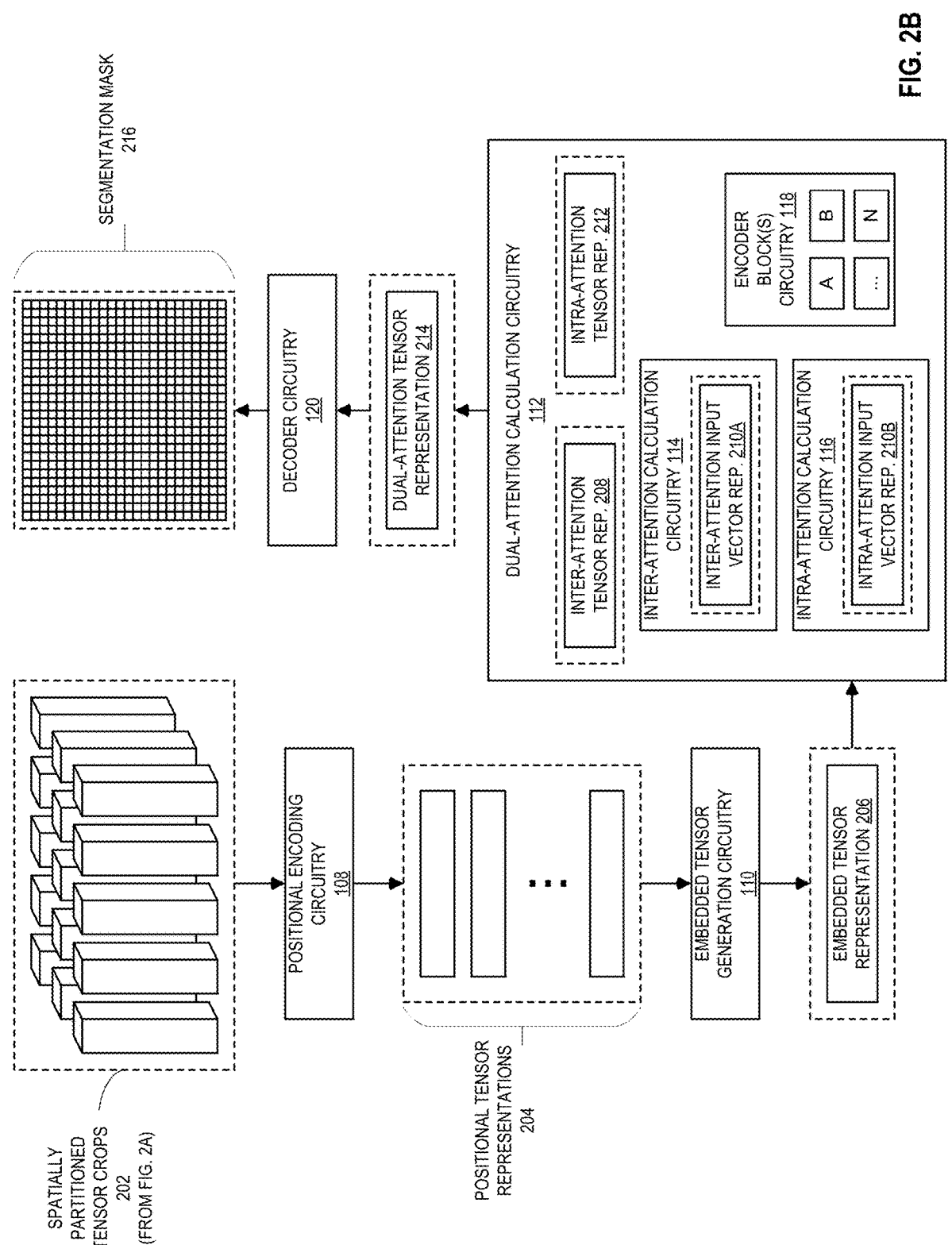

FIGS. 2A and 2B show an example flow of information through the example dual-attention vision transformer circuitry 102 of FIG. 1 to perform interactive image segmentation. To show the data flow and the interaction of the hardware/circuitry elements with the data flow, in FIGS. 2A and 2B, elements that are data are encapsulated by dotted lines and elements that are hardware/circuitry are not encapsulated as such.

An example interactive image segmentation vision transformer neural network is referred to herein as IS-ViT, and an example dual-attention-based ViT neural network is referred to herein as DA-ViT. In some examples, the IS-ViT and DA-ViT neural networks can either be implemented separately or implemented in an overlapping fashion, as explained below. The illustrated process flow of FIGS. 2A and 2B represents actions performed by the dual-attention vision transformer circuitry 102 to implement the IS-ViT and DA-ViT.

Turning now to FIG. 2A, the example IS-ViT neural network includes a current query image X that is made up of image data 122 (e.g., stored in memory 104 of FIG. 1) and context features (e.g., user-related annotation features). Example context features include binary channel representations of positive user clicks $S_p$ and negative user clicks $S_n$ (e.g., positive/negative click masks 124A) and distance transforms defined by the clicks, denoted as $T_p$ (positive transform) for positive user clicks and $T_n$ (negative transform) for negative user clicks. In "binary channel," "binary" refers to the two-state representation of data as either a positive click or a negative click. A positive click occurs when a user is prompted to click on an object in an image. Any resulting user click(s) after such prompting is referred to as a positive click defining a corresponding location of the click event in the object. A negative click occurs when a user is prompted to click on areas of the image that are not within a defined object in an image. Any resulting user click(s) after such prompting is a negative click defining a corresponding location of the click event not in the object. In some examples, other context features are also present, such as positive/negative diffusion masks 124B, among others. In examples disclosed herein, a diffusion mask is similar to a positive or negative click mask except that each positive or negative click includes a spatial range around the click (e.g., a circle with a radius expanding out from the click) as representative of each defined click. A positive distance transform $T_p(p)$ and a negative distance transform $T_n(p)$ are defined in Equations 1A and 1B below.

Positive (1A) and negative (1B) distance transforms.    Equation 1.

1A.  $T_p(p) = \min_{q \in S_p} \lVert p - q \rVert_2$

1B.  $T_n(p) = \min_{q \in S_n} \lVert p - q \rVert_2$

In Equations 1A and 1B above, for a given set of two data points, p and q, the positive distance transform ($T_p(p)$) is minimum Euclidean norm of the difference between p and q for all values of q in the set of positive user clicks ($S_p$) and the negative distance transform ($T_n(p)$) is minimum Euclidean norm of the difference between p and q for all values of q in the set of negative user clicks ($S_n$). In examples using a pixel data type, the data points p and q represent pixels. In examples disclosed herein, $\hat{X}$, $S_p$, $S_n$, $T_p$, and $T_n$ are concatenated together (e.g., for each image data layer and each context feature data layer, which also can be referred to as channels) and provided to the IS-ViT network. In some examples, this concatenated network input is referred to as the input tensor 200 of FIG. 2A. Equation 2 below illustrates an example tensor.

$$X \in \mathbb{R}^{H \times W \times C}$$

Equation 2. Input tensor 200.

In Equation 2 above, the tensor X is an element of a real number H×W×C matrix, where H is the height of an image, W is the width of the image, and C is the number of channels/layers in the image. The example tensor crop partition circuitry 106 is provided the input tensor 200 and partitions the input tensor 200 into a group of spatially partitioned tensor crops 202 (e.g., partitions information in the input tensor 200), where (H,W) is the resolution of the original image, C is the number of image channels, and (P,P) is the resolution of each image crop in pixels (P). In examples disclosed herein, a spatially partitioned tensor crop 202 is a patch of the image including P×P pixels partitioned based on a relative spatial position within the image as a whole. Thus, a grid of P×P pixel patches make up the overall image of height H and width W. Equation 3 shows the resulting number of tensor crops.

Number of crops.    Equation 3.

$$N = \frac{HW}{P^2}$$

In Equation 3 above, a number of crops N is equal to the height (H) multiplied by the width (W) of an image, divided by the area of each patch of pixels (where P is the x, y dimensions of a patch of pixels (e.g., the tensor crop x, y dimensions) if the patch is square). In some examples, the number of crops N serves as the effective input sequence length for the dual-attention calculation circuitry 112, described in detail below. Thus, each example tensor crop of (P,P) pixels in size includes all layers of the input tensor 200, including one or more image data 122 layers and one or more context features data 124 layers (e.g., positive/negative click mask layer 124A, positive/negative diffusion mask layer 124B, etc.). In some examples, the dual-attention vision transformer circuitry 102 uses a constant latent vector size D throughout all layers.

Turning now to FIG. 2B, the positional encoding circuitry 108 is provided the spatially partitioned tensor crops 202. The positional encoding circuitry 108 reshapes X into a sequence of flattened two-dimensional (2D) tensors (e.g., vectors). Equation 4 denotes an example sequence of flattened 2D tensors.

$$x_p \in \mathbb{R}^{N \times (P^2 C)}$$

Equation 4. Sequence of flattened crops.

In Equation 4, the tensor of an individual patch ($X_p$) is an element of the real number matrix N (number of patches)×$P^2$ (area of a patch)×C (the number of channels/layers (e.g., image data layers+context feature data layers) in the image). In some examples, the positional encoding projection circuitry 108 generates a positional tensor representation for each tensor crop. The positional tensor representation corresponding to a tensor crop includes a linear projection of the tensor crop and a positional encoding to identify a location of the tensor crop relative to the other tensor crops. More specifically, the positional encoding projection circuitry 108 flattens each tensor crop and maps it to D dimensions using a trainable linear projection. In examples disclosed herein, D dimensions represents the number of dimensions in a vector for each tensor crop, which refers to the number of layers described. This is a uniform set of dimensions even if not all dimensions are utilized. For example, if there are 6 color channel data layers and 4 context features data layers that are being utilized to describe a tensor crop in an image, the number of D dimensions may be 10 or it may be more. In the example discussed, D=128. The output of this projection may be referred to as a crop embedding. In the example discussed, H=W=256, P=16, and D=128, where H is the height of a patch in pixels, W is the width of a patch in pixels, the number of patches P is 16, and the number of dimensions D of each patch is 128.

The example positional encoding circuitry 108 prepends a learnable embedding to the sequence of embedded crops and generates learnable positional encodings ($E_{pos}$) for each tensor crop to retain positional image information. In some examples, the positional encoding is one-dimensional (1D). In some examples, the positional encoding circuitry 108 adds (e.g., combines) the linear projection of each tensor crop with the positional encoding to create a series of positional tensor representations 204.

In the illustrated example of FIG. 2B, embedded tensor generation circuitry 110 accesses the series of positional tensor representations 204 and produces an embedded tensor representation 206, which is a tensor (e.g., vector) value representing the series of positional tensor representations concatenated together. The embedded tensor representation 206 is illustrated in Equation 5.

$$z_0 = \left[ x_{class}; x_P^1 E; x_P^2 E; \ldots ; x_P^N E \right] + E_{pos}, \; E \in \mathbb{R}^{(P^2 C) \times D}, \; E_{pos} \in \mathbb{R}^{(N+1) \times D}$$

Equation 5. Embedded Tensor Representation

In Equation 5, the embedding representation $z_0$ includes a sequence of flattened 2D patches where each patch $x_p$ represents a tensor crop from 1 to N number of patches, all combined together, and each patch is multiplied by a positional embedding E and then the entire combination of N number of $x_p$ patches is added to an $E_{pos}$ positional embedding. In Equation 5, E is an element of the real number matrix $P^2$ (area of a patch)×C (the number of channels/layers)×D (the number of dimensions of each vector provided to the dual-attention calculation circuitry 112). In some examples, the dual-attention calculation circuitry 112 uses a constant latent vector size D throughout all layers for calculations. Thus, in Equation 5, $E_{pos}$ is an element of the real number matrix (N (number of patches)+1)×D (the number of dimensions of a vector fed into the dual-attention calculation circuitry 112).

In the illustrated example of FIG. 2B, dual-attention calculation circuitry 112 is provided the embedded tensor representation 206 (e.g., $z_0$) (e.g., the embedded tensor generation circuitry 110 provides the embedded tensor representation as input). The dual-attention calculation circuitry 112 then creates a dual-attention tensor representation, which is a tensor representation produced by elements in both the IS-ViT network and the DA-ViT network to represent both an inter-attention across tensor crops as well as an intra-attention within each tensor crop.

Figure 3:
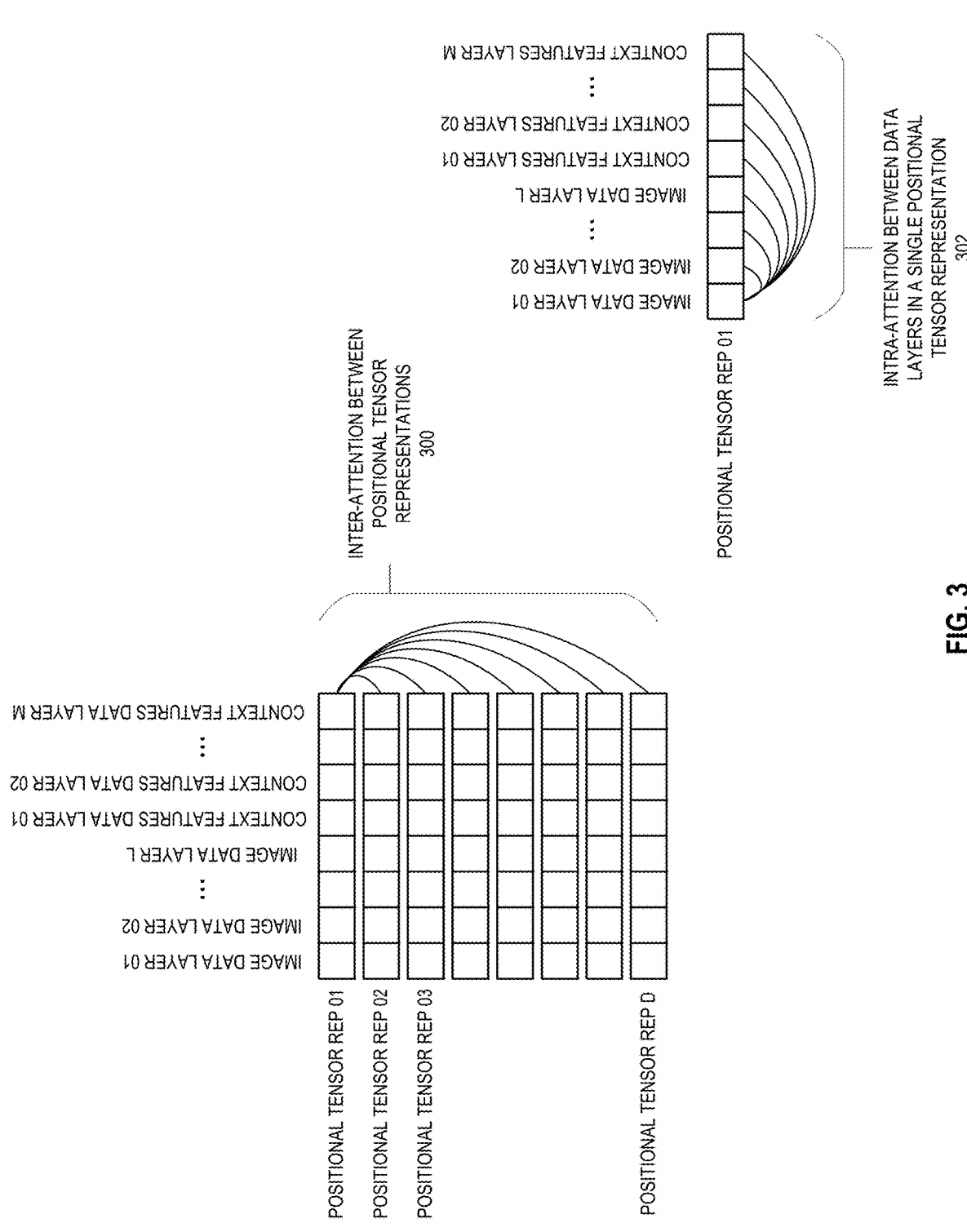
FIG. 3 illustrates an example inter-attention calculation and an intra-attention calculation.

FIG. 3 illustrates positional tensor representations for an inter-attention analysis of data, and positional tensor representation for an intra-attention analysis of data. Using the positional tensor representations 204 described above (e.g., the 2D representations of the three-dimensional (3D) image crops), example inter-attention calculations disclosed herein can be performed by dual-attention calculation circuitry 112 to determine inter-attention relationships. Example inter-attention relationships are shown generally at reference numeral 300 and represent inter-attention relationships between a positional tensor representation 01 and other positional tensor representations 02 through D. Each example positional tensor representation (e.g., 01 through D generally indicated by reference number 300 in FIG. 3) includes a series of layers, such as image data layers 1 through L (e.g., image data layer 01, image data layer 02, through image data layer L) and context features data layers 1 through M (e.g., context features data layer 01, context features data layer 02, through context features data layer M). In the example 300, the inter-attention calculation circuitry 114 calculates the inter-attention one positional tensor representation (e.g., positional tensor representation 01) to all positional tensor representations (e.g., positional tensor representations 01 through D). The inter-attention calculation is repeated for each of the remaining positional tensor representations 02 through D. In the example inter-attention between positional tensor representations 300, the inter-attention of each positional tensor representation is calculated (e.g., compared for relatedness) relative to each of the other positional tensor representations. All layers that are incorporated in each positional tensor representation (e.g., one or more image data layers and one or more context feature data layers) are concatenated together (e.g., blended) as a single value when calculating inter-attention.

Using the example positional tensor representations 204 described above, example intra-attention calculations disclosed herein can be performed by the dual-attention calculation circuitry 112 to determine intra-attention relationships. Example intra-attention relationships are shown generally at reference numeral 302 and represent intra-attention relationships between the layers of a single-positional tensor representation. The example intra-attention calculation circuitry 116 (FIGS. 1 and 2B) calculates an intra-attention between the layers in a single-positional tensor representation (e.g., image data layers 1 through L and context features data layers 1 through M). In intra-attention, each positional tensor representation is calculated separately by comparing context features of each layer in the positional tensor representation to context features of all other layers (or at least ones of the other layers) in the same positional tensor representation (including comparing context features to context features in the same layer).

Returning to FIG. 2B, the example inter-attention calculation circuitry 114 is provided the embedded tensor representation 206, which includes the information for each of the positional tensor representations. The example dual-attention calculation circuitry 112 includes a series of encoder block(s) circuitry 118. In standard applications there are multiple instances of identical encoder blocks, such as encoder block circuitry 118 A, B, and so on, through encoder block circuitry n.

Figure 4:
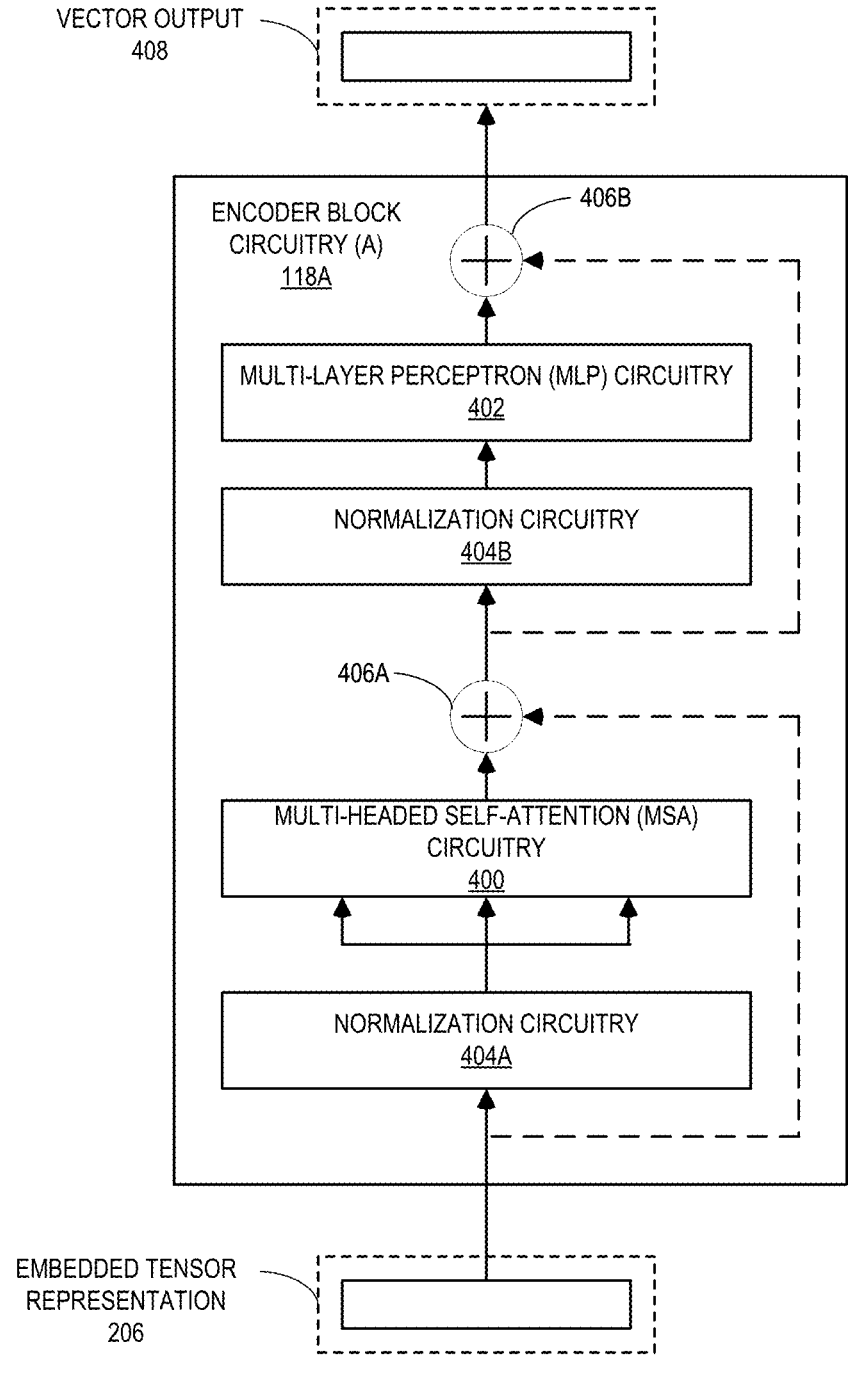
FIG. 4 illustrates an example encoder block of FIG. 1.

FIG. 4 illustrates example encoder block circuitry 118A in the dual-attention calculation circuitry 112. The example encoder block circuitry 118 includes alternating layers of multi-headed self-attention (MSA) circuitry 400 and perceptron (MLP) circuitry 402. The example MSA circuitry 400 calculates self-attention of the input and the MLP circuitry 402 performs feed-forward operations on self-attention output from the MSA circuitry 400. In examples disclosed herein, self-attention means the level of association a single item has to each of a group of items, including itself. For example, if self-attention were calculated for each word in a sentence, certain words may have greater association with other particular words, such as a noun in a sentence and a pronoun in the sentence that refers to the noun, the level of association of those two particular words may be greater than to other words in the sentence. In some examples, self-attention calculates values for the association levels of the items in the group to each other and to themselves. In examples disclosed herein, a feed-forward operation is designed to move information through a neural network in a single direction (e.g., forward) instead of looping. Additionally, an example normalization circuitry (404A and 404B) layer normalizes each MSA layer to generate corresponding normalized multi-headed self-attention outputs and normalizes each MLP layer to generate corresponding normalized multi-layer perceptron outputs. Such normalizing is performed to substantially reduce or eliminate creating exceedingly large/complex numbers. Normalization refers to providing outputs relative to a range between 0 and 1 at each layer. Residual connections (the dotted lines) are also provided between consecutive encoder network layers. In examples disclosed herein, a residual is a connection that allows the output of the previous encoding layer to bypass the subsequent layer. The residual connection helps the encoder network to train by providing a difference each encoder layer has added to the output. In example FIG. 4, residuals are fed around each layer to allow combining 406A an output of the multi-headed self-attention circuitry 400 with the residual to determine the difference (e.g., change) the MSA 400 layer has made to the output and to allow combining 406B an output of the multi-layer perceptron circuitry 402 with the residual to determine the difference (e.g., change) the MLP 402 layer has made to the output. In some examples, the input of the encoder block circuitry 118A is the embedded tensor representation 206 (or a portion of the embedded tensor representation 206) and the output is another vector representation of the embedded tensor representation 206.

In some examples, different instances of the MSA circuitry 400 layer in different ones of the block circuitry 118 (FIGS. 1 and 2B) use a query (q), key (k), value (v) (e.g., "qkv") set of input parameters to calculate inter-attention and/or intra-attention. For each element in an example input sequence z that an encoder block circuitry 118 receives, the MSA circuitry 400 layer computes a weighted sum over all values v in the sequence, which is shown below in Equation 6 and Equation 7.

$$z \in \mathbb{R}^{N \times D}$$

Equation 6. Input sequence for the MSA calculation.

In Equation 6 above, an input sequence z is an element of a real number matrix of N patches×D dimensions, which are portions of the embedded tensor representation 206 from Equation 5 that provides information for patches representing the image. The example dual-attention calculation circuitry 112 calculates self-attention (SA) using Equation 7 below (specifically 7A, 7B, and 7C).

$SA$ calculation.                                                    Equation 7.

7A. $[q, k, v] = zU_{qkv}, U_{qkv} \in \mathbb{R}^{N \times 3D_h}$

7B. $A = softmax\left(\dfrac{qk^T}{\sqrt{D_h}}\right), A \in \mathbb{R}^{N \times N}$ 7C. $SA(z) = Av$ In Equation 7 (7A, 7B, and 7C) above, the attention is computed on a set of queries simultaneously. The attention (A) is calculated using a dot-product (multiplicative) attention and then multiplied by all values in the sequence v to arrive at the self-attention of the input sequence z (e.g., SA(z). For multi-head self-attention (MSA), an extension of SA, the example MSA circuitry 400 executes k self-attention operations in parallel and projects the concatenated inputs. In some examples, MSA may capture a plurality of complex, attention-based functions. In some examples, the MSA circuitry 400 calculates MSA using Equation 8 below.

$$MSA(z)=[SA_1(z);SA_2(z); \ldots ;SA_k(z)]U_{msa}, U_{msa} \in$$
$$\mathbb{R}^{k \cdot D_h \times D}$$

Equation 8. MSA calculation.

In Equation 8 above, the multi-headed self-attention of the input sequence z (e.g., MSA(z) concatenates the k self-attention operation results of the input sequence z. In the illustrated example in FIG. 1, an encoder network of A-N encoder block circuitries 118 is shown. For example, there may be 12 encoder block circuitries 118 in the encoder network, and each MSA circuitry 400 within each encoder block circuitry 118 may include 4 "heads" to allow for greater parallelism. An MSA head is a section of circuitry that can calculate an individual attention value for a tensor (or a layer in a tensor). In other examples, there may be a different number of encoder block circuitries 118 and/or a different number of heads in each MSA circuitry 400.

Returning to FIG. 2B, the example inter-attention calculation circuitry 114 transforms the embedded tensor representation 206 (or a portion of the embedded tensor representation 206) into any format needed by the encoder block circuitry 118 (e.g., into the inter-attention input vector representation 210A) and then causes the encoder block circuitry 118 to calculate the inter-attention tensor representation between the tensor crops (represented as the positional tensor representations 204 in the transformed inter-attention input vector representation 210A). In some examples, the embedded tensor representation 206 has the correct format needed as input for the encoder block circuitry 118, which allows the embedded tensor representation 206 to be forwarded directly to the encoder block circuitry 118. In some examples, the encoder block circuitry 118 calculates the inter-attention for each tensor crop. By performing such calculations, the encoder block circuitry 118 associates a tensor crop with measures of correlation (e.g., relatedness) to each of the other tensor crops and to itself. The encoder block circuitry 118 repeats this process for each tensor crop. In some examples, where there are multiple encoder block circuitries 118 (e.g., a series of A through n encoder block circuitries 118, where A is 1 and n is a positive integer), the inter-attention calculation circuitry 114 provides the embedded tensor representation 206 to the first encoder block circuitry 118 (e.g., encoder block circuitry A) of the series of multiple encoder block circuitries 118. The output of the first encoder block circuitry 118 is passed as input to the second encoder block circuitry 118 (e.g., encoder block circuitry B) of the series of multiple encoder block circuitries 118. In this manner, the outputs of each example encoder block circuitry 118 becomes the input of the next example encoder block circuitry 118 in the series until the final example encoder block circuitry 118. The final output of the last example encoder block circuitry 118 is utilized as an inter-attention tensor representation 208 (e.g., a vector output, a 2D tensor output). The example output is also shown more generally as vector output 408 in FIG. 4. Vector output 408 may be provided by the last encoder block in the series of encoder for further operations, as described below.

The example intra-attention calculation circuitry 116 (FIGS. 1 and 2B) accesses the embedded tensor representation 206, which, as discussed above, includes the information for each of the positional tensor representations. In some examples, the intra-attention calculation circuitry 116 transforms the embedded tensor representation 206 to an intra-attention input vector representation 210B. The example intra-attention input vector representation 210B provides the encoder block circuitry 118 a different input from the original embedded tensor representation 206. Specifically, the example embedded tensor representation 206 has blended information in each encapsulated positional tensor representation 204 (e.g., the image data layers and/or context features data layers are combined into a single representation, instead of being separated). In some examples, the intra-attention calculation circuitry 116 transforms the input data (e.g., the embedded tensor representation 206) for the encoder block circuitry 118, from a standard MSA input linear transformation vector representation with blended layers to a vector representation of the data of each layer (e.g., the one or more image data layers and/or one or more context feature data layers) within the tensor crop. Thus, the inter-attention inputs are a series of positional tensor representations 204, and the intra-attention inputs are a series of vector representations of layers of data in a single positional tensor representation 204. In some examples, the alternate intra-attention input format provides more finely grained input about relationships within each image crop tensor, on a pixel-by-pixel level, between different pixels, between pixels and context features, and between context features.

In some examples, the intra-attention calculation circuitry 116 transforms the embedded tensor representation 206 into an intra-attention input vector representation 210B. The example intra-attention calculation circuitry 116 provides the intra-attention input vector representation 210B to the encoder block circuitry 118. The example encoder block circuitry 118 then calculates an individual intra-attention tensor representation 212 (e.g., the output of the encoder block circuitry 118 when its input has been transformed in such a way). In some examples, the encoder block circuitry 118 calculates the individual intra-attention tensor representation 212 for each tensor crop 202 (or more specifically, for each positional tensor representation 204) and then combines them into a larger tensor representation. For clarity purposes, the larger tensor representation may be described as a "combined" intra-attention tensor representation 212. In a simplified example, with one positional tensor representation 204, the intra-attention tensor representation 212 is the final version utilized when combining for dual-attention purposes.

More specifically, the example encoder block circuitry 118 calculates dual-attention using two parallel processes: inter-attention and intra-attention. For inter-attention, the example encoder block circuitry 118 utilizes standard MSA operations such as example Equations 7 and 8 above. In some examples, this yields a latent representation connoting attention between different positional tensor representations 204 (e.g., the series of vector representations of the tensor crops 202). In some examples, for intra-attention, the process of the encoder block circuitry 118 described above in connection with FIG. 4 is utilized with the intra-attention input vector representation 210B, thus the MSA calculations are performed independently for each tensor crop (e.g., each positional tensor representation 204 in the embedded tensor representation 206) and, specifically, for the layers in each tensor crop. Multi-headed self-attention operations are still used to determine the intra-attention tensor representation 212, but the inputs provided to the encoder block circuitry 118 to calculate the attention are layer data inputs in the intra-attention input vector representation 210B instead of full tensor crop data inputs in the inter-attention input vector representation 210A.

The example dual-attention calculation circuitry 112 combines each separate intra-attention result (e.g., SA(z1)) together into the above-mentioned "combined" intra-attention tensor representation, referred to as the CIntraA calculation. An example CIntraA calculation is illustrated in Equation 9.

$$\text{CIntra}A(z) = [SA(z_1); \\ SA(z_2); \ldots ; SA(z_N)]$$ Equation 9. CIntraA calculation.

In Equation 9 above, the combined intra-attention tensor representation (CIntraA(z)) is a combination (e.g., concatenation) of all self-attention tensor representations within each z tensor patch ($SA(z_1)$ to $SA(z_N)$). The encoder block circuitry 118 calculates/determines the intra-attention (e.g., self-attention (SA)) of each of the layers in each tensor crop ($z_1$ to $z_P$). The dual-attention calculation circuitry 112 then calculates the CIntraA result by combining (e.g., concatenating) all of the SA calculation results to determine an overall intra-attention result across all of the tensor crops. The combined group of intra-attention tensor representations can be a single intra-attention tensor representation 212 but can also be a set of multiple separate intra-attention tensor representations that have not been combined into a single result.

In some examples, no additional model parameters are required for the DA-ViT process to complete. In some examples, the dual-attention process changes the dimension of the tensor/vector that is output from the dual-attention calculation circuitry 112 because the dimensions are based on the results of inter-attention and intra-attention calculations instead of just inter-attention calculations. In some examples, dual-attention is calculated with multiple heads in a way analogous to multi-headed operations for self-attention. In some examples, dual-attention makes use of alternating MSA and MLP operations with residual connections.

The example dual-attention calculation circuitry 112 then concatenates the resulting inter-attention tensor representation 208 and the combined group of intra-attention tensor representations 212 in Equation 10 into a single dual-attention tensor representation 214 so that downstream attention calculations in the DA-ViT architecture can synergize inter-attention features and intra-attention features. This allows both the self-attention values (e.g., calculated levels of association) of tensor crops to other tensor crops as well as the self-attention values of layers within each tensor crop to other layers within each tensor crop to be represented in downstream calculations.

$$DA(z) = MSA(z); \text{CIntra}A(z)$$ Equation 10. DA calculation.

In Equation 10, the dual-attention tensor representation (DA(z)) is a combination (e.g., concatenation) of the multi-headed self-attention tensor representation (MSA(z)) and the combined intra-attention tensor representation (CIntraA (z)). In some examples, for the DA-ViT architecture, the first MSA layer (e.g., encoder block circuitry 118) of the IS-ViT architecture with the aforementioned dual attention head (see FIG. 5). Thus, in some examples, if there are 12 encoder block circuitries 118 (as mentioned above), the first encoder block circuitry 118 of the 12 encoder block circuitries performs the dual-attention calculations, as described above, and the remaining blocks return to a standard MSA calculation and the results are concatenated together. In other examples, there may be more than a single encoder block circuitry 118 that performs the dual-attention calculations.

In the illustrated example in FIG. 2B, the dual-attention calculation circuitry 112 provides the dual-attention tensor representation 214 to the decoder circuitry 120. In some examples, the decoder circuitry 120 includes a decoder network consisting of three lightweight MLPs, each including a normalization layer and a linear layer that progressively project the output of the encoder network from: D (128) dimensions to L (1024), to 4 L dimensions to (H W)/4 dimensions. In some examples, the decoder translates the dual-attention tensor representation into an image segmentation mask 216 by applying an upsampling operation (e.g., 'bilinear' interpolation with scale factor 2) to recover the original dimensions of the input image (e.g., the image data 122 of FIGS. 1 and 2A). In some examples, the decoder circuitry 120 performs a mapping from the relatively small latent dimension (D) of the encoder network to the full output resolution of the image without introducing an excessive number of model parameters.

In some examples, the apparatus includes means for partitioning information in an input tensor into a plurality of tensor crops. For example, the means for partitioning may be implemented by tensor crop partition circuitry 106. In some examples, the tensor crop partition circuitry 106 may be implemented by machine executable instructions such as that implemented by at least block 502 of FIG. 5 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the tensor crop partition circuitry 106 is implemented by other hardware logic circuitry, hardware implemented state machines, and/or any other combination of hardware, software, and/or firmware. For example, the tensor crop partition circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for generating a positional tensor representation corresponding to a tensor crop. For example, the means for generating a positional tensor representation may be implemented by positional encoding circuitry 108. In some examples, the positional encoding circuitry 108 may be implemented by machine executable instructions such as that implemented by at least block 504 of FIG. 5 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the positional encoding circuitry 108 is implemented by other hardware logic circuitry, hardware implemented state machines, and/or any other combination of hardware, software, and/or firmware. For example, the positional encoding circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for generating an embedded tensor representation. For example, the means for generating an embedded tensor representation may be implemented by embedded tensor generation circuitry 110. In some examples, the embedded tensor generation circuitry 110 may be implemented by machine executable instructions such as that implemented by at least block 506 of FIG. 5 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the embedded tensor generation circuitry 110 is implemented by other hardware logic circuitry, hardware implemented state machines, and/or any other combination of hardware, software, and/or firmware. For example, the embedded tensor generation circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for creating a dual-attention tensor representation. For example, the means for creating a dual-attention tensor representation may be implemented by dual-attention calculation circuitry 112. In some examples, the dual-attention calculation circuitry 112 may be implemented by machine executable instructions such as that implemented by at least block 508 of FIG. 5 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the dual-attention calculation circuitry 112 is implemented by other hardware logic circuitry, hardware implemented state machines, and/ or any other combination of hardware, software, and/or firmware. For example, the dual-attention calculation circuitry 112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for causing at least one encoder block to calculate the inter-attention tensor representation between the first tensor crop and the plurality of tensor crops. For example, the means for causing at least one encoder block to calculate the inter-attention tensor representation may be implemented by inter-attention calculation circuitry 114. In some examples, the inter-attention calculation circuitry 114 may be implemented by machine executable instructions such as that implemented by at least block 704 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the inter-attention calculation circuitry 114 is implemented by other hardware logic circuitry, hardware implemented state machines, and/or any other combination of hardware, software, and/or firmware. For example, the inter-attention calculation circuitry 114 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for causing at least one encoder block to calculate the intra-attention tensor representation between the first layer in the first tensor crop and the plurality of layers in the first tensor crop. For example, the means for causing at least one encoder block to calculate the intra-attention tensor representation may be implemented by intra-attention calculation circuitry 116. In some examples, the intra-attention calculation circuitry 116 may be implemented by machine executable instructions such as that implemented by at least block 804 of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the intra-attention calculation circuitry 116 is implemented by other hardware logic circuitry, hardware implemented state machines, and/or any other combination of hardware, software, and/or firmware. For example, the intra-attention calculation circuitry 116 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for normalizing the embedded tensor representation and one or more self-attention outputs. For example, the means for normalizing may be implemented by normalization circuitry 304A and 304B. In some examples, the normalization circuitry 304A and 304B may be implemented by machine executable instructions such as that implemented by at least blocks 602 and 606 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the normalization circuitry 304A and 304B is implemented by other hardware logic circuitry, hardware implemented state machines, and/or any other combination of hardware, software, and/or firmware. For example, the normalization circuitry 304A and 304B may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for performing self-attention operations. For example, the means for performing self-attention operations may be implemented by multi-headed self-attention circuitry 300. In some examples, the multi-headed self-attention circuitry 300 may be implemented by machine executable instructions such as that implemented by at least block 604 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the multi-headed self-attention circuitry 300 is implemented by other hardware logic circuitry, hardware implemented state machines, and/or any other combination of hardware, software, and/or firmware. For example, the multi-headed self-attention circuitry 300 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for performing feed-forward operations. For example, the means for performing feed-forward operations may be implemented by multi-layer perceptron circuitry 302. In some examples, the multi-layer perceptron circuitry 302 may be implemented by machine executable instructions such as that implemented by at least blocks 608 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the multi-layer perceptron circuitry 302 is implemented by other hardware logic circuitry, hardware implemented state machines, and/or any other combination of hardware, software, and/or firmware. For example, the multi-layer perceptron circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the dual-attention vision transformer circuitry 102 is illustrated in FIG. 1, one or more of the elements, processes, and/or devices illustrated in FIG. 1 may be combined, divided, re-arranged, omitted, eliminated, and/or implemented in any other way. Further, the example tensor crop partition circuitry 106, the example positional encoding circuitry 108, the example embedded tensor generation circuitry 110, the example dual-attention calculation circuitry 112, the example inter-attention calculation circuitry 114, the example intra-attention calculation circuitry 116, the example encoder block(s) circuitry 118, the example decoder circuitry 120, and/or, more generally, the example dual-attention vision transformer circuitry 102 of FIG. 1, may be implemented by hardware, software, firmware, and/or any combination of hardware, software, and/or firmware. Thus, for example, any of the example tensor crop partition circuitry 106, the example positional encoding circuitry 108, the example embedded tensor generation circuitry 110, the example dual-attention calculation circuitry 112, the example inter-attention calculation circuitry 114, the example intra-attention calculation circuitry 116, the example encoder block(s) circuitry 118, the example decoder circuitry 120, and/or, more generally, the example dual-attention vision transformer circuitry 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example dual-attention vision transformer circuitry 102, the example tensor crop partition circuitry 106, the example positional encoding circuitry 108, the example embedded tensor generation circuitry 110, the example dual-attention calculation circuitry 112, the example inter-attention calculation circuitry 114, the example intra-attention calculation circuitry 116, the example encoder block(s) circuitry 118, and the example decoder circuitry 120, is/are hereby expressly defined to include a non-transitory computer readable storage device or storage disk such as a memory, a digital versatile disk (DVD), a compact disk (CD), a Blu-ray disk, etc., including the software and/or firmware. Further still, the example dual-attention vision transformer circuitry 102 may include one or more elements, processes, and/or devices in addition to, or instead of, those illustrated in FIG. 9, and/or may include more than one of any or all of the illustrated elements, processes and devices.

Flowcharts representative of example hardware logic circuitry, machine readable instructions, hardware implemented state machines, and/or any combination thereof for implementing the dual-attention vision transformer circuitry 102 are shown in FIGS. 5-8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-8, many other methods of implementing the example dual attention vision transformer circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.)

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
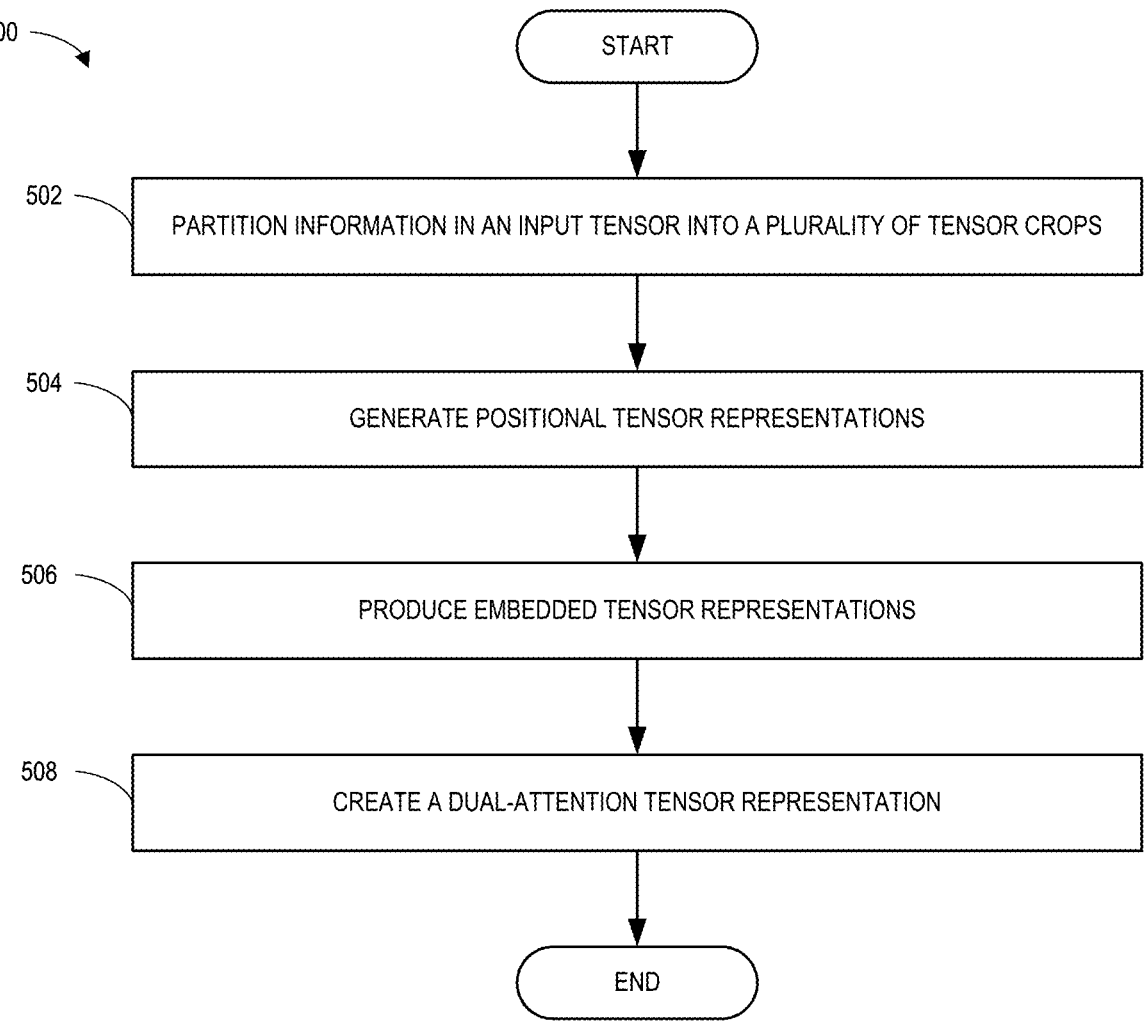
FIG. 5 is a flowchart representative of example machine readable instructions and/or example operations that may be executed and/or instantiated by processor circuitry to implement the dual-attention vision transformer of FIG. 1 to perform interactive image segmentation.

FIG. 5 is a flowchart representative of example machine readable instructions and/or example operations 500 that may be executed and/or instantiated by processor circuitry to implement the example dual-attention vision transformer 102 (FIG. 1) to perform interactive image segmentation. The machine readable instructions and/or operations 500 of FIG. 5 begin at block 502, at which the example tensor crop partition circuitry 106 (FIG. 1) partitions information in an input tensor into a plurality of tensor crops. For example, the input tensor includes a plurality (e.g., multiple) layers of data that include a first layer and a second layer, and the plurality of tensor crops include a first tensor crop and a second tensor crop.

At block 504, the example positional encoding circuitry 108 (FIG. 1) generates positional tensor representations. In some examples, the positional encoding circuitry 108 generates a first positional tensor representation corresponding to the first tensor crop and a second positional tensor representation corresponding to the second tensor crop. In other examples, additional tensor representations are generated. For example, the number of generated tensor representations may equal the number of crops or patches of pixels that an image (e.g., represented by the image data) is divided into.

At block 506, the example embedded tensor generation circuitry 110 (FIGS. 1 and 2B) produces embedded tensor representations (e.g., the embedded tensor representation 206 of FIG. 2B). In some examples, the embedded tensor representation 206 generated at block 506 includes a concatenated value that represents at least the first positional tensor representation and the second positional tensor representation of block 504. In some examples, after the embedded tensor generation circuitry 110 generates the embedded tensor representation 206, the dual-attention calculation circuitry 112 accesses the embedded tensor representation 206. In other examples, block 506 is skipped and the dual-attention calculation circuitry 112 performs processes directly with the first positional tensor representation and the second positional tensor representation of block 504, among other positional tensor representations (as needed).

At block 508, the example dual-attention calculation circuitry 112 (FIGS. 1 and 2B) creates a dual-attention tensor representation (e.g., the dual-attention tensor representation 214 of FIG. 2B). In some examples, the dual-attention tensor representation 214 includes an inter-attention tensor representation and an intra-attention tensor representation. In some examples, the inter-attention tensor representation indicates an attention of the first tensor crop to other tensor crops of the plurality of tensor crops. In some examples, the intra-attention tensor representation indicates an attention of the first layer in the first crop to other layers in the first crop. In some examples, the intra-attention calculation includes multiple attention calculations that represent the attention of each layer to all of the layers in the first crop. Therefore, if there are 4 layers (e.g., layers 1-4), an attention calculations performed to determine the attention of layer 1 to each of the four layers, layers 1-4, an attention calculation is performed to determine the attention of layer 2 to each of the four layers, layers 1-4, an attention calculation is performed to determine the attention of layer 3 to each of the four layers, layers 1-4, and an attention calculation is performed to determine the attention of layer 4 to each of the four layers, layers 1-4. Those four attention calculations are then put together in a tensor/vector format, which can be provided to decoder circuitry 120 when needed.

Figure 6:
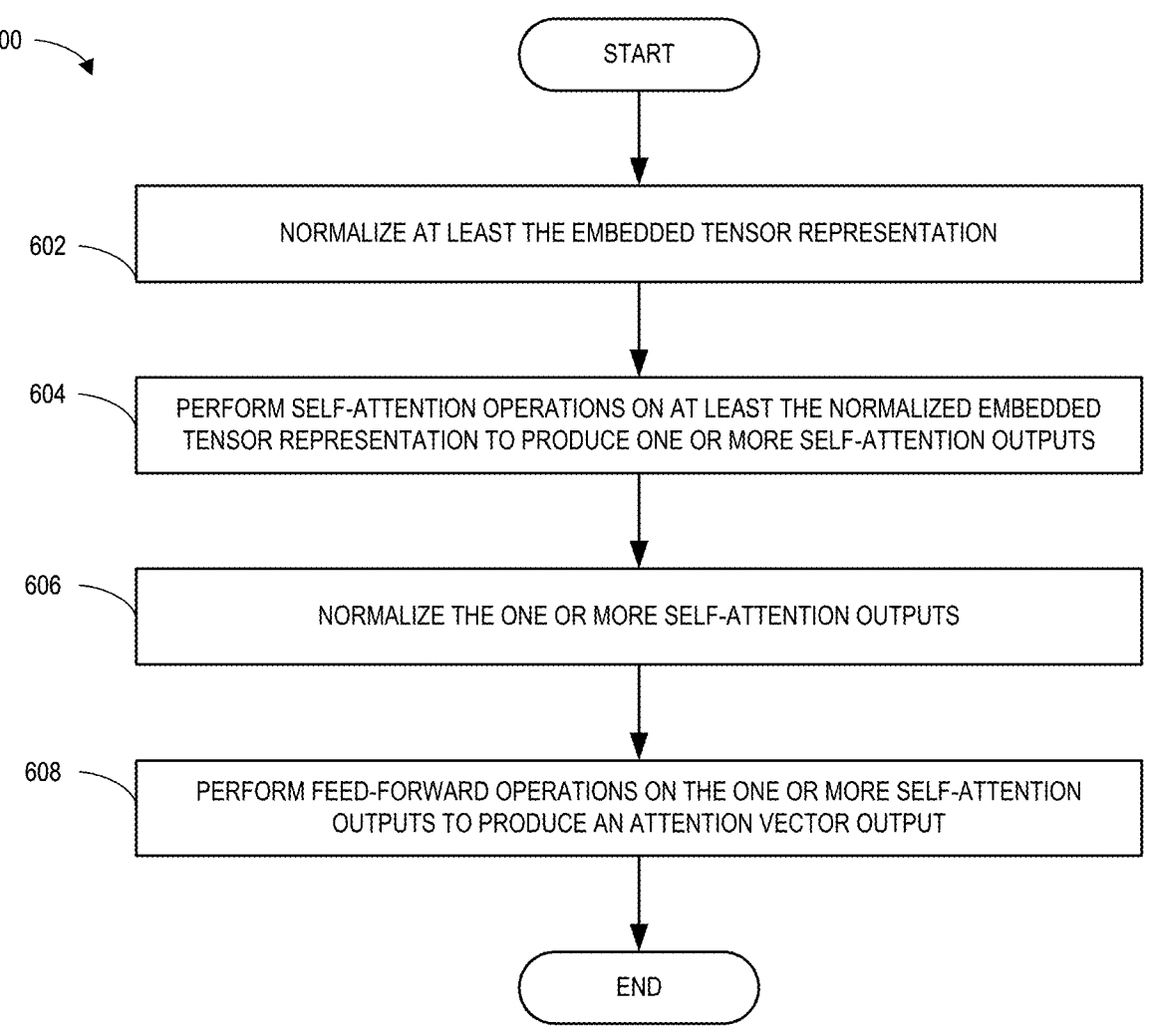
FIG. 6 is a flowchart representative of example machine readable instructions and/or example operations that may be executed and/or instantiated by processor circuitry to implement the dual-attention vision transformer of FIG. 1 to encode an input tensor using dual-attention.

FIG. 6 is a flowchart representative of example machine readable instructions and/or example operations 600 that may be executed and/or instantiated by processor circuitry to encode an input tensor using dual-attention. The machine readable instructions and/or operations 600 of FIG. 6 begin at block 602, at which the example normalization circuitry 404A (FIG. 4) normalizes an embedded tensor representation (e.g., the embedded tensor representation 206 of FIGS. 2B and 4).

At block 604, the example multi-headed self-attention circuitry 400 (FIG. 4) performs self-attention operations (e.g., Equations 7A-7C and Equation 8) on at least the normalized embedded tensor representation to produce one or more self-attention outputs.

At block 606, the example normalization circuitry 404B (FIG. 4) normalizes the one or more self-attention outputs.

At block 608, the example multi-layer perception circuitry 402 (FIG. 4) performs feed-forward operations on the one or more normalized self-attention outputs to produce an attention vector output (e.g., the vector output 408 of FIG. 4).

In some examples, there are multiple encoder blocks (e.g., encoder blocks 118 A-N of FIGS. 1 and 2B) where each encoder block is a copy of the other blocks and the encoder blocks are set up in a series so the output vectors of each block are utilized as the tensor representation input of the next block in the series. In some examples, the final encoder block in the series outputs one or more tensors/vectors that can be provided to the decoder circuitry 120.

FIG. 7 is a flowchart representative of example machine readable instructions and/or example operations 700 that may be executed and/or instantiated by processor circuitry to calculate an inter-attention tensor representation (e.g., an inter-attention tensor representation 208 of FIG. 2B). The machine readable instructions and/or operations 700 of FIG. 7 begin at block 702, at which the example inter-attention calculation circuitry 114 (FIGS. 1 and 2B) transforms the embedded tensor representation 206 (FIGS. 2B and 4) to an inter-attention input vector representation 210A (FIG. 2B). In some examples, the inter-attention calculation circuitry 114 generates the inter-attention input vector representation 210A in a particular format that is readable or useable by the encoder block circuitry 118 (FIGS. 1 and 2B). In some examples, this involves a reformatting of one or more elements of data in the embedded tensor representation 206. In other examples, at least one encoder block in the encoder block circuitry 118 is capable of performing calculations using an unformatted (e.g., a non-transformed) version of the embedded tensor representation 210A. In such examples, the transform operation of block 702 is skipped, and the embedded tensor representation 210A is provided to the encoder block circuitry 118.

At block 704, the example inter-attention calculation circuitry 114 (FIGS. 1 and 2B) causes the at least one encoder block to calculate the inter-attention tensor representation 208 (FIG. 2B) between the first tensor crop and the plurality of tensor crops, using the embedded tensor representation 206. In some examples, the inter-attention calculation circuitry 114 uses a multi-headed attention calculation as described in the flowchart in FIG. 6. In some examples, the inter-attention calculation circuitry 114 calculates the attention of each tensor crop, as described above, and then combines them together into a tensor/vector output (e.g., the vector output 408 of FIG. 4).

FIG. 8 is a flowchart representative of example machine readable instructions and/or example operations 800 that may be executed and/or instantiated by processor circuitry to calculate an intra-attention tensor representation 212 (FIG. 2B). The machine readable instructions and/or operations 800 of FIG. 8 begin at block 802, at which the example intra-attention calculation circuitry 116 (FIGS. 1 and 2B) transforms the embedded tensor representation 206 (FIG. 2B) to an intra-attention input vector representation 210B. In some examples, the intra-attention input vector representation 210B is a transformed (e.g., reformatted) format of the data in the embedded tensor representation 206 to allow at least one encoder block in the encoder block circuitry 118 to perform calculations on data the embedded tensor representation 206. As discussed above in the description of "intra-attention," in some examples, the transformation allows the encoder block circuitry 118 to calculate the relatedness (e.g., correlation) between each layer in a given tensor crop to all of the layers in the tensor crop.

At block 804, the example intra-attention calculation circuitry 116 causes the at least one encoder block of the encoder block circuitry 118 to calculate the intra-attention tensor representation 212 between the first layer in the first tensor crop and the plurality of layers in the first tensor crop, using the intra-attention input vector representation 210B. In some examples, the intra-attention calculation circuitry 116 uses a multi-headed attention calculation as described in the flowchart in FIG. 6, but instead of providing the input to the multi-headed attention calculation as a group of tensor crops, the input is instead the layers within a tensor crop. While calculating inter-attention provides a level of relatedness among the tensor crops that are spread out spatially across the image, calculating intra-attention provides a level of relatedness among the layers of a single tensor crop. For example, a tensor crop may have several layers of image data (e.g., image channel data) and several layers of context features associated with the image data. For a given tensor crop that corresponds to a certain X-by-Y grid of pixels in a larger image, there may be context features associated with that X-by-Y grid portion of the image, such as user mouse clicks corresponding to specific pixel locations within the X-by-Y grid portion of the image. Thus, the intra-attention provides a level of relatedness between each of the layers, including the image channel layers and the context feature layers. For a given layer, the attention is calculated against the remaining layers.

In some examples, the intra-attention calculation circuitry 116 can be provided a modified embedded tensor representation 206 that only has the representation for a subset of the plurality of layers. This can provide a customized intra-attention result of the attention among specific layers in the subset, as needed.

Figure 9:
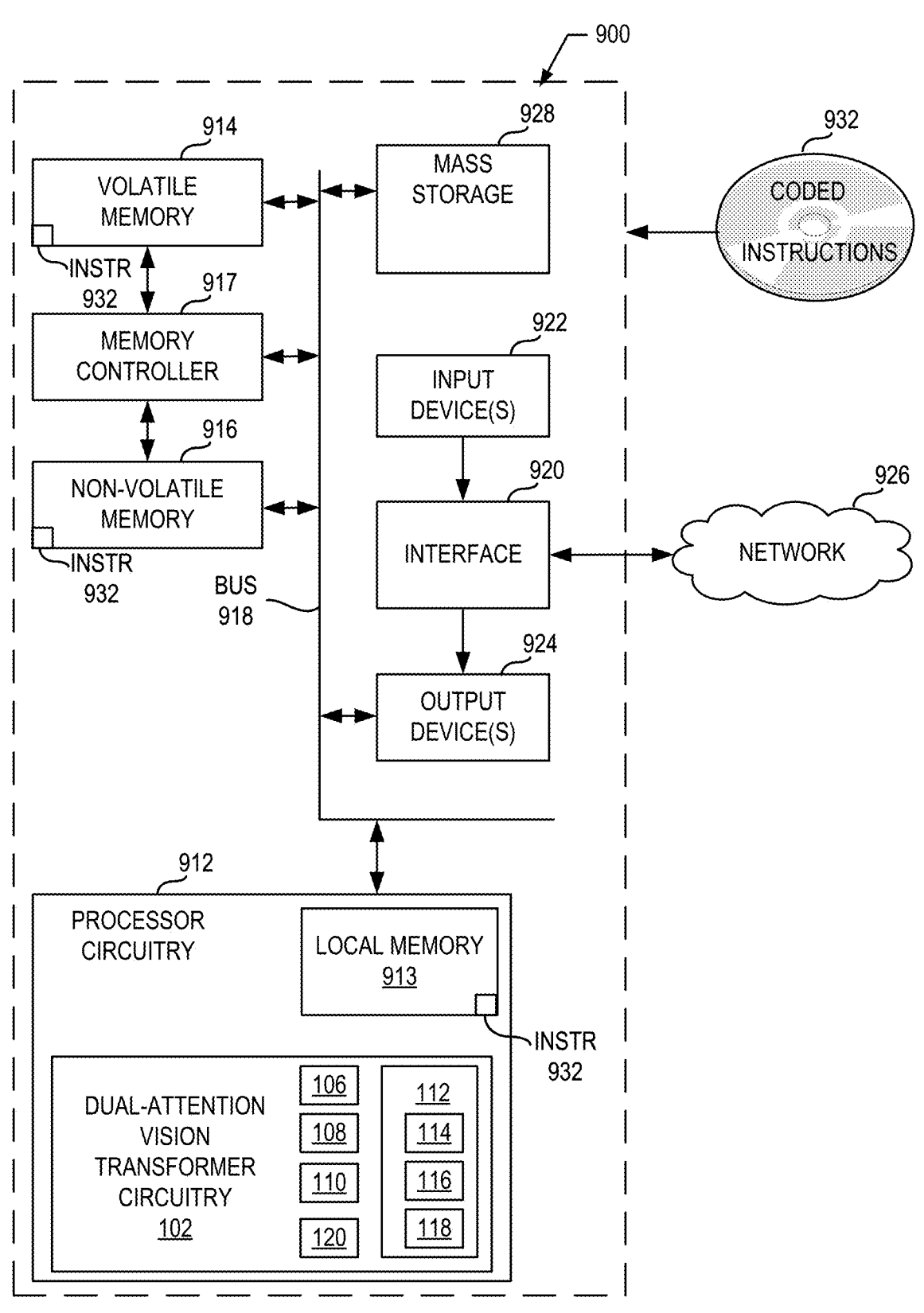
FIG. 9 is a block diagram of an example processing platform including processor circuitry structured to execute the example machine readable instructions of FIGS. 5-8 to implement the dual-attention vision transformer of FIG. 1 to perform interactive image segmentation.

FIG. 9 is a block diagram of an example processor platform 900 structured to execute and/or instantiate the machine readable instructions and/or operations of FIGS. 5-8 to implement the apparatus of FIG. 1. The processor platform 900 can be, for example, a server, a personal computer, a workstation, a self-learning machine (e.g., a neural network), or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the dual-attention vision transformer circuitry 102, the tensor crop partition circuitry 106, the positional encoding circuitry 108, the embedded tensor generation circuitry 110, the dual-attention calculation circuitry 112, the inter-attention calculation circuitry 114, the intra-attention calculation circuitry 116, the encoder block(s) circuitry 118, and the decoder circuitry 120.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIGS. 5-8, may be stored in the mass storage device 928, in the volatile memory 914, in the non-volatile memory 916, and/or on a removable non-transitory computer readable storage medium such as a CD or DVD.

Figure 10:
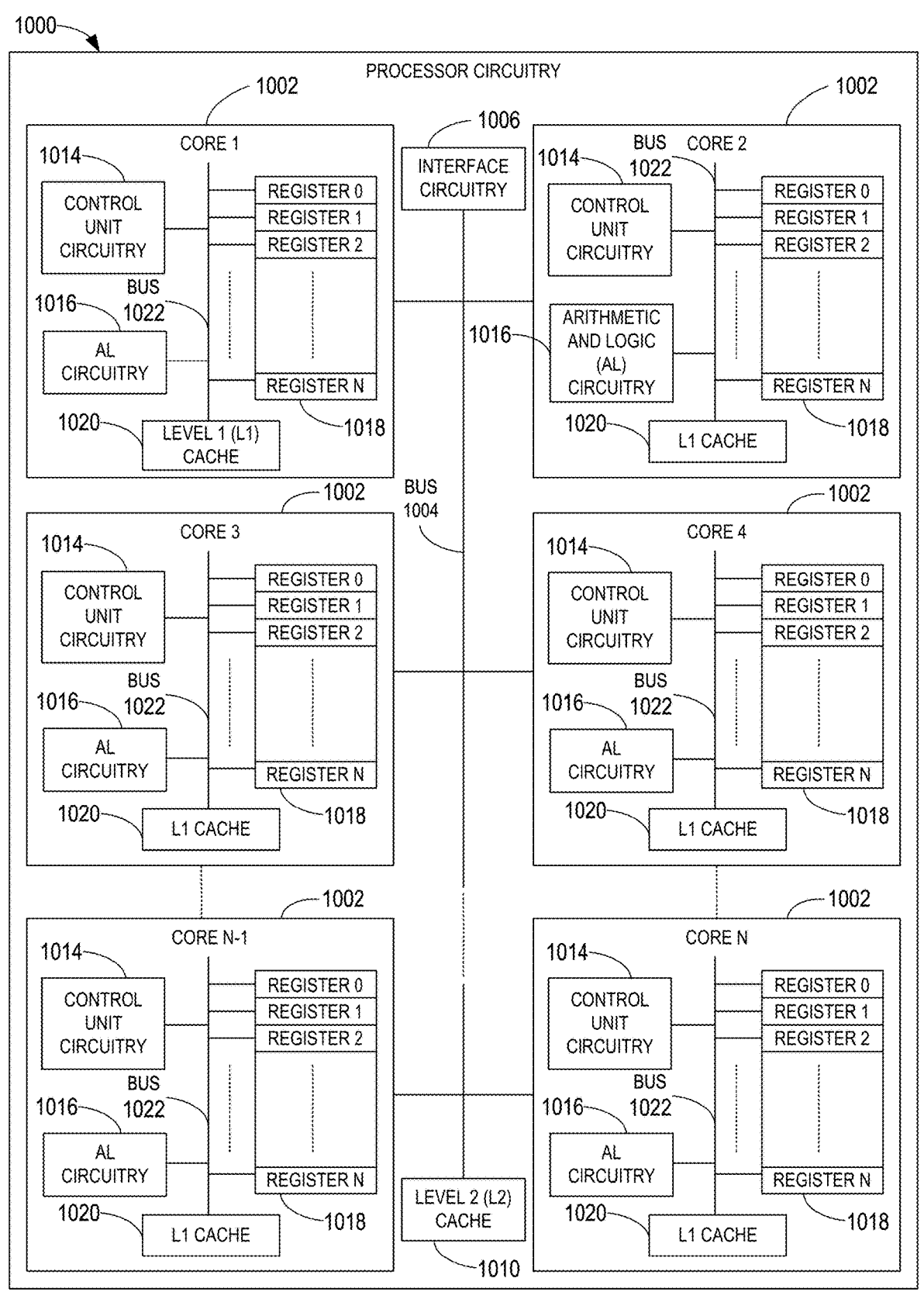
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 5-8.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1020 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
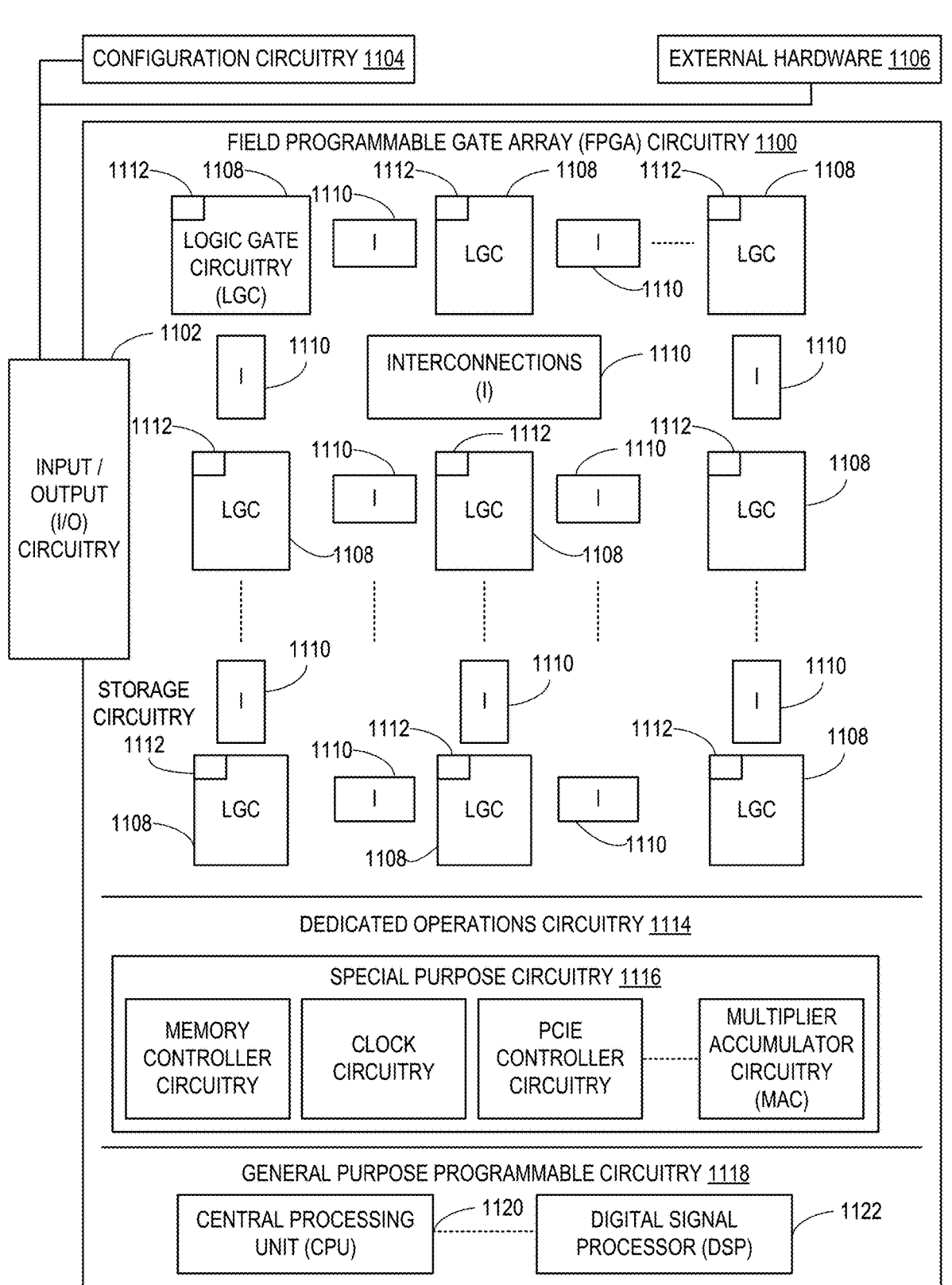
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 5-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 5-8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 5-8. As such, the FPGA circuitry 1100 may be structured to effectively instantiate some or all of the machine readable instructions of the flowcharts of FIGS. 5-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 5-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry

1108 and interconnections 1110 are configurable to instantiate one or more operations that may correspond to at least some of the machine readable instructions of FIGS. 5-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 5-8 may be executed by one or more of the cores 1002 of FIG. 10 and a second portion of the machine readable instructions represented by the flowcharts of FIGS. 5-8 may be executed by the FPGA circuitry 1100 of FIG. 11.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
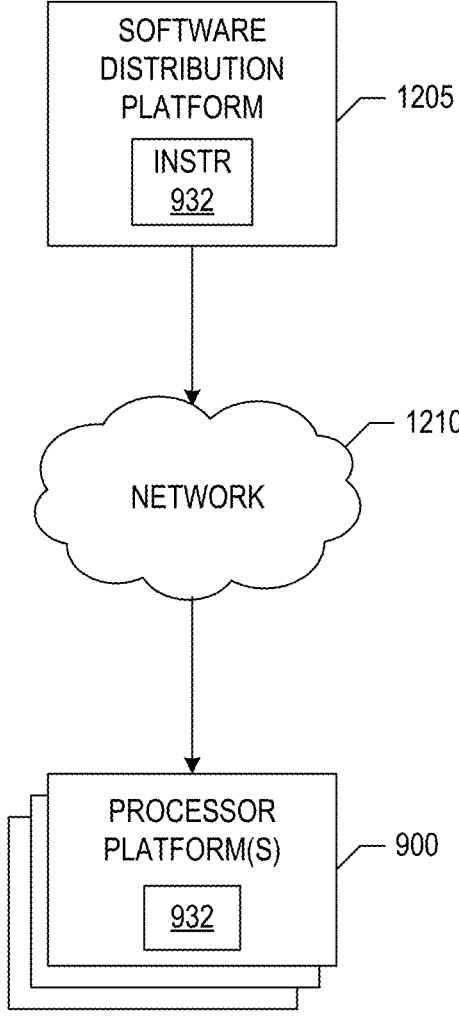
FIG. 12 is a block diagram of an example software distribution platform (e.g., one or more servers) to distribute software (e.g., software corresponding to the example machine readable instructions of FIGS. 5-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 9 of FIG. 9, as described above. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 500, 600, 700, and/or 800 of FIGS. 5-8, may be downloaded to the example processor platform 900, which is to execute the machine readable instructions 932 to implement the dual-attention vision transformer circuitry 102. In some example, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that implement dual-attention vision transformers for interactive image segmentation. The disclosed systems, methods, apparatus, and articles of manufacture improve the efficiency of using a computing device by increasing efficiency in human-in-the-loop data driven workflows, such as human users providing annotated feedback/labeling for images to train models on neural networks. Increasing the efficiency of training vision transformers using examples disclosed herein can positively affect many diverse industries, including medical CV, VFX automation, and general human annotation and assistive problem settings (e.g., data labelling, action recognition, etc.). The disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus for implementing interactive image segmentation, comprising at least one memory, instructions in the apparatus, and processor circuitry to at least one of execute or instantiate the instructions to partition an input tensor into a plurality of tensor crops, the input tensor representing image data of an image, and create a dual-attention tensor representation of the input tensor, the dual-attention tensor representation to include an inter-attention tensor representation and an intra-attention tensor representation, the inter-attention tensor representation to describe a first correlation between the plurality of tensor crops, the intra-attention tensor representation to describe a second correlation between a plurality of layers in a tensor crop of the plurality of tensor crops.

Example 2 includes the apparatus of example 1, wherein the processor circuitry is to at least one of execute or instantiate the instructions to generate an embedded tensor representation of the input tensor and create the dual-attention tensor representation of the input tensor based on the embedded tensor representation.

Example 3 includes the apparatus of example 2, wherein the processor circuitry is to at least one of execute or instantiate the instructions to generate a first positional tensor representation corresponding to a first tensor crop and a second positional tensor representation corresponding to a second tensor crop of the plurality of tensor crops, the first positional tensor representation including a first linear projection of the first tensor crop and a first positional encoding to identify a first location of the first tensor crop relative to the plurality of tensor crops, the second positional tensor representation including a second linear projection of the second tensor crop and a second positional encoding to identify a second location of the second tensor crop relative to the plurality of tensor crops, wherein the embedded tensor representation includes a concatenated value representing at least the first positional tensor representation concatenated with the second positional tensor representation.

Example 4 includes the apparatus of example 2, wherein the processor circuitry is to at least one of execute or instantiate the instructions to transform, based on an attention vector output associated with the input tensor, the embedded tensor representation to an inter-attention input vector representation, calculate the inter-attention tensor representation between the plurality of tensor crops, based on the inter-attention input vector representation.

Example 5 includes the apparatus of example 2, wherein the processor circuitry is to at least one of execute or instantiate the instructions to transform, based on an attention vector output associated with the input tensor, the embedded tensor representation to an intra-attention input vector representation, and calculate the intra-attention tensor representation between the plurality of layers in the tensor crop based on the intra-attention input vector representation.

Example 6 includes the apparatus of example 1, wherein the processor circuitry is to at least one of execute or instantiate the instructions to concatenate the intra-attention tensor representation to the inter-attention tensor representation to create the dual-attention tensor representation.

Example 7 includes the apparatus of example 1, wherein a first layer of the plurality of layers in a tensor crop is a layer of the image data and at least one of the plurality of layers is a layer of context features data, the context features data associated with the image data.

Example 8 includes the apparatus of example 7, wherein the processor circuitry is to at least one of execute or instantiate the instructions to segment the image based on the dual-attention tensor representation of the input tensor.

Example 9 includes the apparatus of example 7, wherein the layer of context features data includes user-related annotation information.

Example 10 includes the apparatus of example 9, wherein the user-related annotation information includes a click mask, the click mask including information describing one or more user clicks on an object of the image.

Example 11 includes At least one non-transitory computer readable medium for implementing interactive image segmentation, comprising instructions that, when executed, cause processor circuitry to at least partition an input tensor into a plurality of tensor crops, the input tensor representing image data of an image, and create a dual-attention tensor representation of the input tensor, the dual-attention tensor representation to include an inter-attention tensor representation and an intra-attention tensor representation, the inter-attention tensor representation to describe a first correlation between the plurality of tensor crops, the intra-attention tensor representation to describe a second correlation between a plurality of layers in a tensor crop of the plurality of tensor crops.

Example 12 includes the at least one non-transitory computer readable medium of example 11, wherein the instructions, when executed, cause the processor circuitry to generate an embedded tensor representation of the input tensor, and create the dual-attention tensor representation of the input tensor based on the embedded tensor representation.

Example 13 includes the at least one non-transitory computer readable medium of example 12, wherein the instructions, when executed, cause the processor circuitry to generate a first positional tensor representation corresponding to a first tensor crop and a second positional tensor representation corresponding to a second tensor crop of the plurality of tensor crops, the first positional tensor representation including a first linear projection of the first tensor crop and a first positional encoding to identify a first location of the first tensor crop relative to the plurality of tensor crops, the second positional tensor representation including a second linear projection of the second tensor crop and a second positional encoding to identify a second location of the second tensor crop relative to the plurality of tensor crops, wherein the embedded tensor representation includes a concatenated value representing at least the first positional tensor representation concatenated with the second positional tensor representation.

Example 14 includes the at least one non-transitory computer readable medium of example 13, wherein the instructions, when executed, cause the processor circuitry to transform, based on an attention vector output associated with the input tensor, the embedded tensor representation to an inter-attention input vector representation, and calculate the inter-attention tensor representation between the plurality of tensor crops, based on the inter-attention input vector representation.

Example 15 includes the at least one non-transitory computer readable medium of example 13, wherein the instructions, when executed, cause the processor circuitry to transform, based on an attention vector output associated with the input tensor, the embedded tensor representation to an intra-attention input vector representation, and calculate the intra-attention tensor representation between the plurality of layers in the tensor crop based on the intra-attention input vector representation.

Example 16 includes the at least one non-transitory computer readable medium of example 11, wherein the instructions, when executed, cause the processor circuitry to concatenate the intra-attention tensor representation to the inter-attention tensor representation to create the dual-attention tensor representation.

Example 17 includes the at least one non-transitory computer readable medium of example 11, wherein a first layer of the plurality of layers in the tensor crop is a layer of the image data and at least one of the plurality of layers is a layer of context features data, the context features data associated with the image data.

Example 18 includes the at least one non-transitory computer readable medium of example 17, wherein the instructions, when executed, cause the processor circuitry to segment the image based on the dual-attention tensor representation of the input tensor.

Example 19 includes an apparatus for implementing interactive image segmentation, comprising an image database, and processor circuitry including one or more of at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or an Application Specific Integrate Circuitry (ASIC) including logic gate circuitry to perform one or more third operations, the processor circuitry to perform at least one of the one or more first operations, the one or more second operations or the one or more third operations to instantiate tensor crop partition circuitry to partition an input tensor into a plurality of tensor crops, the input tensor representing image data of an image, and dual-attention calculation circuitry to create a dual-attention tensor representation of the input tensor, the dual-attention tensor representation to include an inter-attention tensor representation and an intra-attention tensor representation, the inter-attention tensor representation to describe a first correlation between the plurality of tensor crops, the intra-attention tensor representation to describe a second correlation between a plurality of layers in a tensor crop of the plurality of tensor crops.

Example 20 includes the apparatus of example 19, wherein the processor circuitry to perform at least one of the one or more first operations, the one or more second operations or the one or more third operations to instantiate embedded tensor generation circuitry to generate an embedded tensor representation of the input tensor, and dual-attention calculation circuitry to create the dual-attention tensor representation of the input tensor based on the embedded tensor representation.

Example 21 includes the apparatus of example 20, wherein the processor circuitry to perform at least one of the one or more first operations, the one or more second operations or the one or more third operations to instantiate positional encoding circuitry to generate a first positional tensor representation corresponding to a first tensor crop and a second positional tensor representation corresponding to a second tensor crop of the plurality of tensor crops, the first positional tensor representation including a first linear projection of the first tensor crop and a first positional encoding to identify a first location of the first tensor crop relative to the plurality of tensor crops, the second positional tensor representation including a second linear projection of the second tensor crop and a second positional encoding to identify a second location of the second tensor crop relative to the plurality of tensor crops, wherein the embedded tensor representation includes a concatenated value representing at least the first positional tensor representation concatenated with the second positional tensor representation.

Example 22 includes the apparatus of example 21, wherein the processor circuitry to perform at least one of the one or more first operations, the one or more second operations or the one or more third operations to instantiate at least one encoder block, the at least one encoder block including multi-headed self-attention circuitry to perform self-attention operations on a normalized embedded tensor representation to produce one or more self-attention outputs, normalization circuitry to normalize the embedded tensor representation and the one or more self-attention outputs, and multi-layer perceptron circuitry to perform feed-forward operations on one or more normalized self-attention outputs to produce an attention vector output.

Example 23 includes the apparatus of example 22, wherein the processor circuitry to perform at least one of the one or more first operations, the one or more second operations or the one or more third operations to instantiate inter-attention calculation circuitry to determine the inter-attention tensor representation, the inter-attention calculation circuitry to transform based on an attention vector output associated with the input tensor, the embedded tensor representation to an inter-attention input vector representation, and cause the at least one encoder block to calculate the inter-attention tensor representation between plurality of tensor crops, based on the inter-attention input vector representation.

Example 24 includes the apparatus of example 22, wherein the processor circuitry to perform at least one of the one or more first operations, the one or more second operations or the one or more third operations to instantiate intra-attention calculation circuitry to determine the intra-attention tensor representation, the intra-attention calculation circuitry to transform based on an attention vector output associated with the input tensor, the embedded tensor representation to an intra-attention input vector representation, and cause the at least one encoder block to calculate the intra-attention tensor representation between the plurality of layers in the tensor crop of the plurality of tensor crops based on the intra-attention input vector representation.

Example 25 includes the apparatus of example 20, wherein the dual-attention calculation circuitry is further to concatenate the intra-attention tensor representation to the inter-attention tensor representation to create the dual-attention tensor representation.

Example 26 includes a method for implementing interactive image segmentation, comprising partitioning an input tensor into a plurality of tensor crops, the input tensor representing image data of an image, and creating a dual-attention tensor representation of the input tensor, the dual-attention tensor representation to include an inter-attention tensor representation and an intra-attention tensor representation, the inter-attention tensor representation to describe a first correlation between the plurality of tensor crops, the intra-attention tensor representation to describe a second correlation between a plurality of layers in a tensor crop of the plurality of tensor crops.

Example 27 includes the method of example 26, further including generating an embedded tensor representation of the input tensor and creating the dual-attention tensor representation of the input tensor based on the embedded tensor representation.

Example 28 includes the method of example 27, further including generating a first positional tensor representation corresponding to a first tensor crop and a second positional tensor representation corresponding to a second tensor crop of the plurality of tensor crops, the first positional tensor representation including a first linear projection of the first tensor crop and a first positional encoding to identify a first location of the first tensor crop relative to the plurality of tensor crops, the second positional tensor representation including a second linear projection of the second tensor crop and a second positional encoding to identify a second location of the second tensor crop relative to the plurality of tensor crops, wherein the embedded tensor representation includes a concatenated value representing at least the first positional tensor representation concatenated with the second positional tensor representation.

Example 29 includes the method of example 28, further including transforming, based on an attention vector output associated with the input tensor, the embedded tensor representation to an inter-attention input vector representation, and calculating the inter-attention tensor representation between the plurality of tensor crops, based on the inter-attention input vector representation.

Example 30 includes the method of example 28, further including transforming, based on an attention vector output associated with the input tensor, the embedded tensor representation to an intra-attention input vector representation, and calculating the intra-attention tensor representation between the plurality of layers in the tensor crop based on the intra-attention input vector representation.

Example 31 includes the method of example 26, further including concatenating the intra-attention tensor representation to the inter-attention tensor representation to create the dual-attention tensor representation.

Example 32 includes the method of example 26, wherein a first layer of the plurality of layers in the tensor crop is a layer of the image data and at least one of the plurality of layers is a layer of context features data, the context features data associated with the image data.

Example 33 includes the method of example 32, further including segmenting the image based on the dual-attention tensor representation of the input tensor.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for implementing interactive image segmentation, comprising:
   at least one memory;
   instructions; and
   at least one programmable circuit to be programmed based on the instructions to:
      create a dual-attention tensor representation of an input tensor, the input tensor based on image data of an image, the dual-attention tensor representation to include an inter-attention tensor representation and an intra-attention tensor representation, the inter-attention tensor representation to describe a first correlation between a plurality of tensor crops partitioned from the input tensor, the intra-attention tensor representation to describe a second correlation between a plurality of layers in a tensor crop of the plurality of tensor crops;

segment the image based on the dual-attention tensor representation to generate a segmentation mask, the segmentation mask to identify pixels of the image associated with an object in the image; and output the segmentation mask.

2. The apparatus of claim 1, wherein one or more of the at least one programmable circuit is to:

generate an embedded tensor representation of the input tensor; and create the dual-attention tensor representation of the input tensor based on the embedded tensor representation.

3. The apparatus of claim 2, wherein one or more of the at least one programmable circuit is to:

generate a first positional tensor representation corresponding to a first tensor crop and a second positional tensor representation corresponding to a second tensor crop of the plurality of tensor crops, the first positional tensor representation including a first linear projection of the first tensor crop and a first positional encoding to identify a first location of the first tensor crop relative to the plurality of tensor crops, the second positional tensor representation including a second linear projection of the second tensor crop and a second positional encoding to identify a second location of the second tensor crop relative to the plurality of tensor crops, and the embedded tensor representation includes a concatenated value representing at least the first positional tensor representation concatenated with the second positional tensor representation.

4. The apparatus of claim 2, wherein one or more of the at least one programmable circuit is to:

transform, based on an attention vector output associated with the input tensor, the embedded tensor representation to an inter-attention input vector representation; and calculate the inter-attention tensor representation between the plurality of tensor crops based on the inter-attention input vector representation.

5. The apparatus of claim 2, wherein one or more of the at least one programmable circuit is to:

transform, based on an attention vector output associated with the input tensor, the embedded tensor representation to an intra-attention input vector representation; and calculate the intra-attention tensor representation between the plurality of layers in the tensor crop based on the intra-attention input vector representation.

6. The apparatus of claim 1, wherein one or more of the at least one programmable circuit is to:

concatenate the intra-attention tensor representation to the inter-attention tensor representation to create the dual-attention tensor representation.

7. The apparatus of claim 1, wherein a first layer of the plurality of layers in a tensor crop is a layer of the image data and at least one of the plurality of layers is a layer of context features data, the context features data associated with the image data.

8. The apparatus of claim 7, wherein the layer of context features data includes user-related annotation information.

9. The apparatus of claim 8, wherein the user-related annotation information includes a click mask, the click mask including information describing one or more user clicks on an object of the image.

10. At least one non-transitory computer readable medium comprising instructions to cause at least one programmable circuit to at least:

create a dual-attention tensor representation of an input tensor, the input tensor based on image data of an image, the dual-attention tensor representation to include an inter-attention tensor representation and an intra-attention tensor representation, the inter-attention tensor representation to describe a first correlation between a plurality of tensor crops partitioned from the input tensor, the intra-attention tensor representation to describe a second correlation between a plurality of layers in a tensor crop of the plurality of tensor crops;

segment the image based on the dual-attention tensor representation to generate a segmentation mask, the segmentation mask to identify pixels of the image associated with an object in the image; and output the segmentation mask.

11. The at least one non-transitory computer readable medium of claim 10, wherein the instructions are to cause one or more of the at least one programmable circuit to:

generate an embedded tensor representation of the input tensor; and create the dual-attention tensor representation of the input tensor based on the embedded tensor representation.

12. The at least one non-transitory computer readable medium of claim 11, wherein the instructions are to cause one or more of the at least one programmable circuit to:

generate a first positional tensor representation corresponding to a first tensor crop and a second positional tensor representation corresponding to a second tensor crop of the plurality of tensor crops, the first positional tensor representation including a first linear projection of the first tensor crop and a first positional encoding to identify a first location of the first tensor crop relative to the plurality of tensor crops, the second positional tensor representation including a second linear projection of the second tensor crop and a second positional encoding to identify a second location of the second tensor crop relative to the plurality of tensor crops, wherein the embedded tensor representation includes a concatenated value representing at least the first positional tensor representation concatenated with the second positional tensor representation.

13. The at least one non-transitory computer readable medium of claim 12, wherein the instructions are to cause one or more of the at least one programmable circuit to:

transform, based on an attention vector output associated with the input tensor, the embedded tensor representation to an inter-attention input vector representation; and calculate the inter-attention tensor representation between the plurality of tensor crops based on the inter-attention input vector representation.

14. The at least one non-transitory computer readable medium of claim 12, wherein the instructions are to cause one or more of the at least one programmable circuit to:

transform, based on an attention vector output associated with the input tensor, the embedded tensor representation to an intra-attention input vector representation; and calculate the intra-attention tensor representation between the plurality of layers in the tensor crop based on the intra-attention input vector representation.

15. The at least one non-transitory computer readable medium of claim 10, wherein the instructions are to cause one or more of the at least one programmable circuit to:

concatenate the intra-attention tensor representation to the inter-attention tensor representation to create the dual-attention tensor representation.

16. The at least one non-transitory computer readable medium of claim 10, wherein a first layer of the plurality of layers in the tensor crop is a layer of the image data and at least one of the plurality of layers is a layer of context features data, the context features data associated with the image data.

17. An apparatus for implementing interactive image segmentation, comprising:

an image database; and processor circuitry including one or more of:

at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;

a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or an Application Specific Integrate Circuitry (ASIC) including logic gate circuitry to perform one or more third operations;

the processor circuitry to perform at least one of the one or more first operations, the one or more second operations or the one or more third operations to instantiate:

tensor crop partition circuitry to partition an input tensor into a plurality of tensor crops, the input tensor representing image data of an image;

dual-attention calculation circuitry to create a dual-attention tensor representation of the input tensor, the dual-attention tensor representation to include an inter-attention tensor representation and an intra-attention tensor representation, the inter-attention tensor representation to describe a first correlation between the plurality of tensor crops, the intra-attention tensor representation to describe a second correlation between a plurality of layers in a tensor crop of the plurality of tensor crops; and decoder circuitry to:

segment the image based on the dual-attention tensor representation to generate a segmentation mask, the segmentation mask to identify pixels of the image associated with an object in the image; and output the segmentation mask.

18. The apparatus of claim 17, wherein the processor circuitry is to perform at least one of the one or more first operations, the one or more second operations or the one or more third operations to instantiate:

embedded tensor generation circuitry to generate an embedded tensor representation of the input tensor; and dual-attention calculation circuitry to create the dual-attention tensor representation of the input tensor based on the embedded tensor representation.

19. The apparatus of claim 18, wherein the processor circuitry is to perform at least one of the one or more first operations, the one or more second operations or the one or more third operations to instantiate:

positional encoding circuitry to generate a first positional tensor representation corresponding to a first tensor crop and a second positional tensor representation corresponding to a second tensor crop of the plurality of tensor crops, the first positional tensor representation including a first linear projection of the first tensor crop and a first positional encoding to identify a first location of the first tensor crop relative to the plurality of tensor crops, the second positional tensor representation including a second linear projection of the second tensor crop and a second positional encoding to identify a second location of the second tensor crop relative to the plurality of tensor crops, wherein the embedded tensor representation includes a concatenated value representing at least the first positional tensor representation concatenated with the second positional tensor representation.

20. The apparatus of claim 19, wherein the processor circuitry is to perform at least one of the one or more first operations, the one or more second operations or the one or more third operations to instantiate:

at least one encoder block, the at least one encoder block including multi-headed self-attention circuitry to perform self-attention operations on a normalized embedded tensor representation to produce one or more self-attention outputs, normalization circuitry to normalize the embedded tensor representation and the one or more self-attention outputs, and multi-layer perceptron circuitry to perform feed-forward operations on one or more normalized self-attention outputs to produce an attention vector output.

21. The apparatus of claim 20, wherein the processor circuitry is to perform at least one of the one or more first operations, the one or more second operations or the one or more third operations to instantiate:

inter-attention calculation circuitry to determine the inter-attention tensor representation, the inter-attention calculation circuitry to:

transform based on an attention vector output associated with the input tensor, the embedded tensor representation to an inter-attention input vector representation; and cause the at least one encoder block to calculate the inter-attention tensor representation between plurality of tensor crops, based on the inter-attention input vector representation.

22. The apparatus of claim 20, wherein the processor circuitry is to perform at least one of the one or more first operations, the one or more second operations or the one or more third operations to instantiate:

intra-attention calculation circuitry to determine the intra-attention tensor representation, the intra-attention calculation circuitry to:

transform based on an attention vector output associated with the input tensor, the embedded tensor representation to an intra-attention input vector representation; and cause the at least one encoder block to calculate the intra-attention tensor representation between the plurality of layers in the tensor crop of the plurality of tensor crops based on the intra-attention input vector representation.

23. The apparatus of claim 18, wherein the dual-attention calculation circuitry is to concatenate the intra-attention tensor representation to the inter-attention tensor representation to create the dual-attention tensor representation.

\* \* \* \* \*